United States Patent
Gao et al.

(10) Patent No.: US 11,451,787 B2
(45) Date of Patent: Sep. 20, 2022

(54) METHOD AND APPARATUS FOR VIDEO ENCODING AND DECODING

(71) Applicant: TENCENT TECHNOLOGY (SHENZHEN) COMPANY LIMITED, Shenzhen (CN)

(72) Inventors: Xinwei Gao, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/996,850

(22) Filed: Aug. 18, 2020

(65) Prior Publication Data

US 2020/0382792 A1 Dec. 3, 2020

Related U.S. Application Data

(63) Continuation of application No. PCT/CN2019/089676, filed on May 31, 2019.

(30) Foreign Application Priority Data

Jun. 20, 2018 (CN) .......................... 201810638881.8

(51) Int. Cl.
*H04N 19/146* (2014.01)
*H04N 19/124* (2014.01)
(Continued)

(52) U.S. Cl.
CPC ......... *H04N 19/146* (2014.11); *H04N 19/124* (2014.11); *H04N 19/132* (2014.11); *H04N 19/172* (2014.11); *H04N 19/42* (2014.11)

(58) Field of Classification Search
CPC ...... H04N 19/00; H04N 19/59; H04N 19/124; H04N 19/132; H04N 19/146; H04N 19/172
See application file for complete search history.

(56) References Cited

U.S. PATENT DOCUMENTS 9,749,583 B1 * 8/2017 Fineberg ................ H04N 7/142
9,832,540 B2 * 11/2017 Liao ........................ H04N 19/14
(Continued)

FOREIGN PATENT DOCUMENTS

CN 101778275 A 7/2010
CN 102714726 A 10/2012
(Continued)

OTHER PUBLICATIONS

The State Intellectual Property Office of the People's Republic of China (SIPO) Office Action 1 for for 201810638881.8 dated Mar. 19, 2021 9 Pages (including translation).
(Continued)

*Primary Examiner* — Kyle M Lotfi
(74) *Attorney, Agent, or Firm* — Anova Law Group, PLLC

(57) ABSTRACT

A video coding method is provided. The method includes obtaining an input video frame, obtaining a sampling parameter corresponding to the input video frame, determining downsampling information according to the sampling parameter, and encoding the input video frame according to the downsampling information to obtain encoded data corresponding to the input video frame, where determining the downsampling information includes: in response to determining the input video frame includes a B-frame, selecting a first downsampling proportion for the B-frame; and in response to determining the input video frame includes a P-frame, selecting a second downsampling proportion for the P-frame, the second downsampling proportion is lower
(Continued)

than the first downsampling proportion, and the first and the second downsampling proportions are part of the downsampling information.

17 Claims, 13 Drawing Sheets

(51) Int. Cl.
*H04N 19/132* (2014.01)
*H04N 19/172* (2014.01)
*H04N 19/42* (2014.01)

(56) References Cited

U.S. PATENT DOCUMENTS

| | | | |
|---|---|---|---|
| 10,375,534 B2* | 8/2019 | Rezvani | H04W 4/14 |
| 2003/0123554 A1 | 7/2003 | Kim et al. | |
| 2010/0158136 A1* | 6/2010 | Peng | H04N 19/132 |
| | | | 375/240.27 |
| 2011/0058605 A1 | 3/2011 | Ma | |
| 2011/0170608 A1* | 7/2011 | Shi | H04N 19/96 |
| | | | 375/240.24 |
| 2012/0328200 A1 | 12/2012 | Liu et al. | |
| 2014/0140407 A1 | 5/2014 | Yu et al. | |
| 2014/0328382 A1* | 11/2014 | Lee | H04N 19/164 |
| | | | 375/240.01 |
| 2015/0052239 A1* | 2/2015 | Lamarca | H04L 41/5029 |
| | | | 709/224 |
| 2016/0330453 A1 | 11/2016 | Zhang et al. | |
| 2019/0253704 A1 | 8/2019 | Mao et al. | |
| 2019/0253717 A1 | 8/2019 | Mao | |

FOREIGN PATENT DOCUMENTS

| | | |
|---|---|---|
| CN | 103813174 A | 5/2014 |
| CN | 105657321 A | 6/2016 |
| CN | 105959700 A | 9/2016 |
| CN | 106961604 A | 7/2017 |
| CN | 107155107 A | 9/2017 |
| CN | 108833918 A | 11/2018 |
| EP | 2448270 A1 | 5/2012 |
| WO | WO-9321601 A1 * 10/1993 | ............. H04N 19/10 |

OTHER PUBLICATIONS

Hanqi Shen, "Research on Super-Resolution technology for the Compressed Videos," Full-text database of China's outstanding master's theses (electronic journals), Feb. 15, 2017 (Feb. 15, 2017). 136 pages.
The World Intellectual Property Organization (WIPO) International Search Report for PCT/CN2019/089676 dated Sep. 3, 2019 5 Pages (including translation).

* cited by examiner

| ... | ... | ... | ... | ... | ... | ... |
|---|---|---|---|---|---|---|
| ... | C1 | c11 | A1 | a11 | B1 | b11 | ... |
| ... | c13 | c12 | a13 | a12 | b13 | b12 | ... |
| ... | C2 | c21 | A2 | a21 | B2 | b21 | ... |
| ... | c23 | c22 | a23 | a22 | b13 | b22 | ... |
| ... | C3 | c31 | A3 | a31 | B3 | b31 | ... |
| ... | c33 | c32 | a33 | a32 | b33 | b32 | ... |
| ... | ... | ... | ... | ... | ... | ... |

| C1 | ... | ... | ... | A1 | ... | ... | ... | B1 |
|---|---|---|---|---|---|---|---|---|
| ... | ... | ... | ... | ... | ... | ... | ... | ... |
| ... | ... | ... | ... | ... | ... | ... | ... | ... |
| ... | ... | ... | ... | ... | ... | ... | ... | ... |
| C2 | ... | ... | ... | A2 | a4 | a8 | a12 | B2 |
| ... | ... | ... | ... | a1 | a5 | a9 | a13 | ... |
| ... | ... | ... | ... | a2 | a6 | a10 | a14 | ... |
| ... | ... | ... | ... | a3 | a7 | a11 | a15 | ... |
| C3 | ... | ... | ... | A3 | ... | ... | ... | B3 |

METHOD AND APPARATUS FOR VIDEO ENCODING AND DECODING

RELATED APPLICATIONS

This application claims priority to PCT Application No. PCT/CN2019/089676, filed on May 31, 2019, which in turn claims priority to Chinese Patent Application No. 201810638881.8, entitled "VIDEO ENCODING METHOD AND APPARATUS, VIDEO DECODING METHOD AND APPARATUS, COMPUTER DEVICE, AND STORAGE MEDIUM" and filed on Jun. 20, 2018, which are both incorporated by reference in their entirety.

FIELD OF THE TECHNOLOGY

This application relates to the field of computer processing technologies, and in particular to a video encoding method and apparatus, a video decoding method and apparatus, a computer device, and a storage medium.

BACKGROUND OF THE DISCLOSURE

With the development of digital media technologies and computer technologies, videos are widely used in a variety of fields, such as mobile communication, online surveillance, and web television. With the improvement of hardware performance and screen resolution, there is an increasing requirement for high-definition videos.

Under the condition of limited bandwidth, video quality may be poor in some scenarios as a conventional encoder encodes frames of video indiscriminately. For example, at 750 kbps, when all video frames are encoded indiscriminately, encoders of H.264/H.265/iOS and the like all have a problem of poor quality of some video frames.

SUMMARY

Embodiments of this application provide a video encoding method and apparatus, a video decoding method and apparatus, a computer device, and a storage medium, to adaptively select downsampling information and improve video quality at a limited bandwidth.

One aspect of the present disclosure provides a video encoding method is provided, applied to a computer device. The method includes obtaining an input video frame; obtaining, in response to a target processing method corresponding to the input video frame being a downsampling processing method, a sampling parameter corresponding to the input video frame, and determining downsampling information corresponding to the input video frame according to the sampling parameter, the sampling parameter being reproduced in a decoding process; and encoding the input video frame according to the downsampling information to obtain encoded data corresponding to the input video frame.

Another aspect of the present disclosure provides a video decoding method, applied to a computer device. The method includes receiving encoded data corresponding to a current frame; obtaining, in response to a target processing method corresponding to the current frame being downsampling processing method, a sampling parameter corresponding to the current frame, and determining downsampling information corresponding to the current frame according to the sampling parameter, the sampling parameter being kept consistent with a corresponding sampling parameter in an encoding process; and decoding the encoded data according to the downsampling information corresponding to the video to be decoded to obtain a corresponding decoded video frame.

Another aspect of the present disclosure provides a non-transitory computer-readable storage medium. The computer storage medium storing a computer program, the computer program, when executed by a processor, causing the processor to perform the following operations: obtaining an input video frame; obtaining, in response to a target processing method corresponding to the input video frame being a downsampling processing method, a sampling parameter corresponding to the input video frame, and determining downsampling information corresponding to the input video frame according to the sampling parameter, the sampling parameter being reproduced in a decoding process; and encoding the input video frame according to the downsampling information to obtain encoded data corresponding to the input video frame.

In the foregoing video encoding method and apparatus, computer device, and storage medium, an input video frame is obtained, a sampling parameter corresponding to the input video frame is obtained in a case that a target processing method corresponding to the input video frame is a downsampling processing method, the sampling parameter being reproduced in a decoding process, downsampling information corresponding to the input video frame is determined according to the sampling parameter, and then, the input video frame is encoded according to the downsampling information to obtain corresponding encoded data. In the foregoing encoding method, a sampling parameter is obtained, then downsampling information is determined according to the sampling parameter, and the sampling parameter is reproducible at a decoding end, so that more suitable downsampling information can be flexibly and adaptively selected for each input video frame in an encoding process, thereby improving video quality at a limited bandwidth.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used to describe this application, instead of limiting this application.

Figure 1:
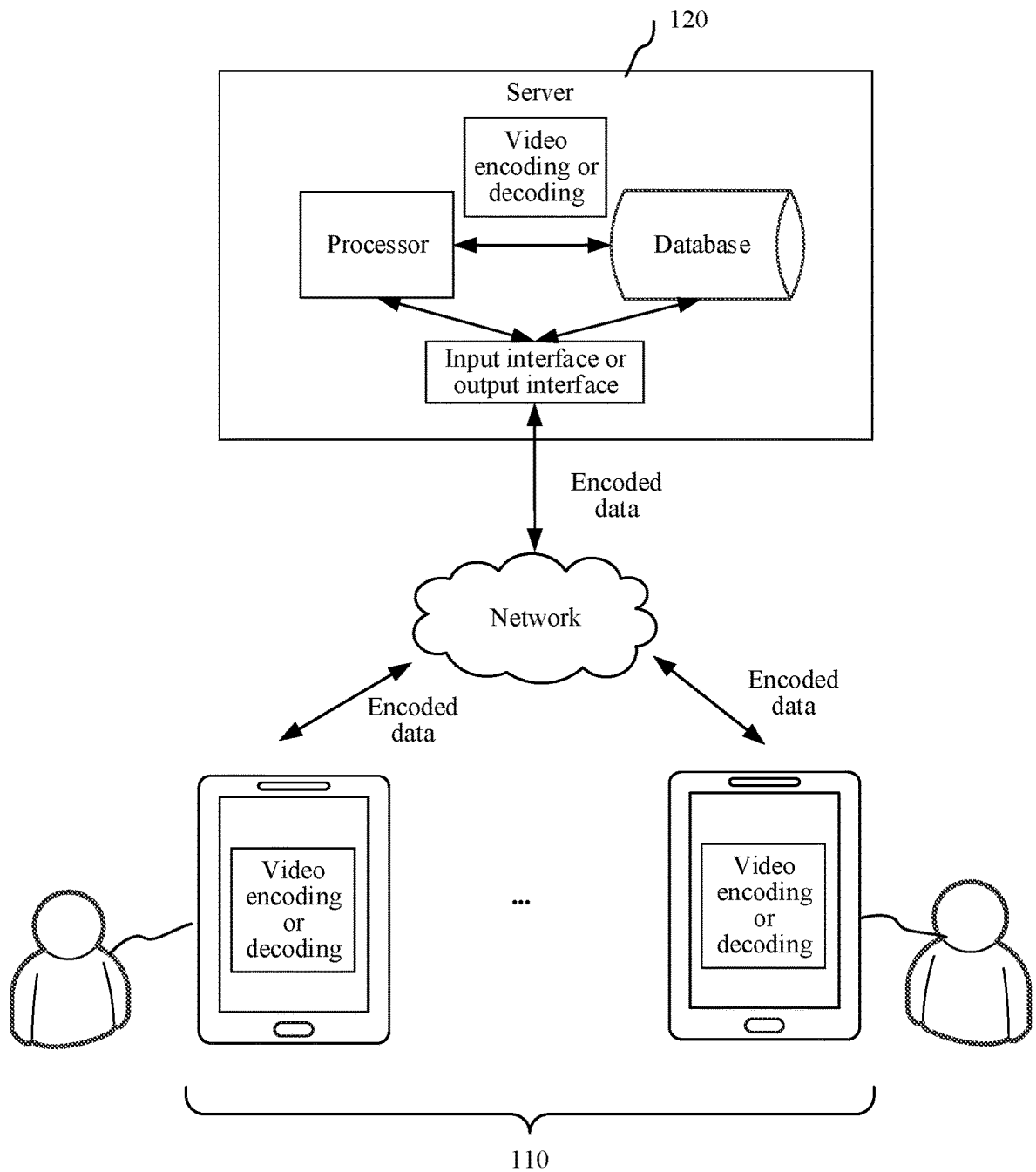
FIG. 1 is a diagram of an application environment of a video encoding method in an embodiment of this application.

FIG. 1 is a diagram of an application environment of a video encoding method and a video decoding method in an embodiment. As shown in FIG. 1, the application environment includes a terminal 110 and a server 120. The terminal 110 may communicate with the server 120 through a network. The terminal 110 may be specifically a desktop terminal or a mobile terminal. The mobile terminal may be specifically at least one of a mobile phone, a tablet computer, a notebook computer, and the like. The server 120 may be implemented by an independent server or a server cluster that includes a plurality of servers. The video encoding method and the video decoding method may be completed in the terminal 110 or the server 120. The terminal 110 may adaptively encode an input video frame by using the video encoding method to obtain encoded data, and then, send the encoded data to the server 120, or may receive, from the server 120, encoded data obtained through adaptive sampling, and perform decoding by using the video decoding method to generate a decoded video frame. The server 120 may transcode a bitstream while storing the bitstream. In this case, the video encoding method is completed on the server 120. If the server 120 needs to decode the bitstream, the video decoding method is completed on the server 120.

Figure 2:
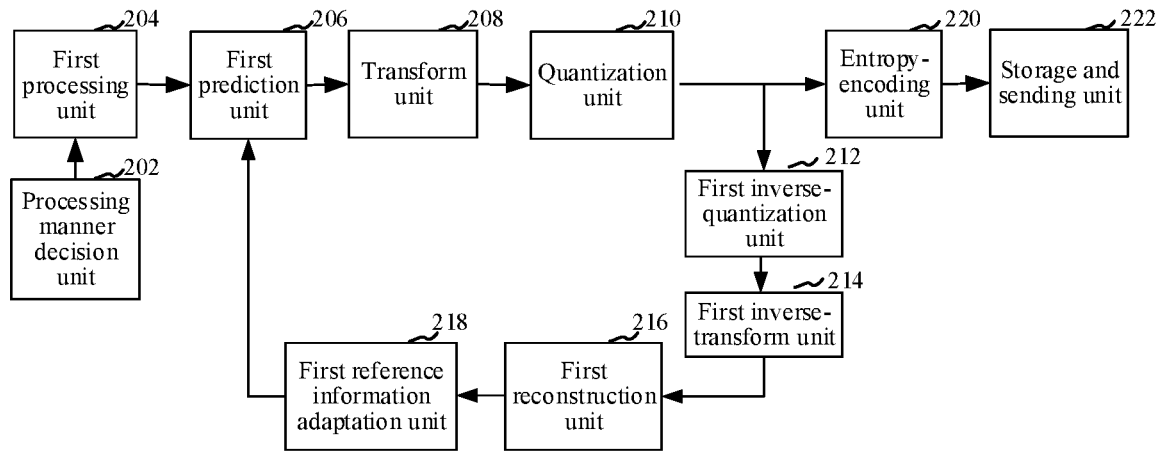
FIG. 2 is a diagram of an encoding framework corresponding to a video encoding method in an embodiment of this application.

FIG. 2 is an encoding framework diagram corresponding to a video encoding method according to an embodiment. According to the video encoding method provided in this embodiment of this application, each input video frame of an inputted video sequence may be obtained for encoding to obtain corresponding encoded data, and the encoded data is stored or sent by using a storage and sending unit 222, or is stored and sent by using the storage and sending unit 222. At a processing method decision unit 202, a processing method of an input video frame may be decided for obtaining a processing method corresponding to the input video frame. At a first processing unit 204, the input video frame may be processed according to the processing method obtained by the processing method decision unit 202 for obtaining a current frame. At a first prediction unit 206, intra-prediction or inter-prediction may be performed on each coded block of the current frame at a resolution of the current frame, and a predicted value and a corresponding motion vector are obtained according to an image value of a reference block corresponding to the coded block, and the predicted value is subtracted from an actual value of the coded block to obtain a prediction residual, where the motion vector represents displacement of the coded block relative to the reference block. At a transform unit 208, a prediction residual and vector information in a spatial domain are transformed to a frequency domain, and a transform coefficient may be encoded. A transform method may be a discrete Fourier transform, a discrete cosine transform, or the like. The vector information may be an actual motion vector representing displacement or a motion vector difference. The motion vector difference is a difference between the actual motion vector and a predicted motion vector.

At a quantization unit 210, transformed data is mapped into another value. For example, the transformed data may be divided by a quantization step to obtain a relatively small value. A quantization parameter is a sequence number corresponding to the quantization step, and a corresponding quantization step may be found according to the quantization parameter. A small quantization parameter indicates reservation of most details of an image frame and a high corresponding code rate. A large quantization parameter indicates a low corresponding code rate, but relatively large distortion and low quality of an image. A principle of quantization is expressed by using the following formula: FQ=round(y/Qstep), where y is a value corresponding to a video frame before quantization is performed, Qstep is a quantization step, and FQ is a quantized value obtained after y is quantized. The Round(x) function is to round a value to an even, that is, to round half to an even. A correspondence between the quantization parameter and the quantization step may be specifically set according to a requirement. For example, in some video encoding standards, for luminance encoding, the quantization step has a total of 52 values that are integers from 0 to 51. For chrominance encoding, the quantization step has values that are integers from 0 to 39. In addition, the quantization step increases as the quantization parameter increases. Each time the quantization parameter is increased by 6, the quantization step is doubled.

An entropy-encoding unit 220 is configured to perform entropy-encoding. The entropy-encoding is encoding based on an entropy principle without losing a data encoding manner of any information, and information can be expressed by using a relatively small character. A method for entropy-encoding may be, for example, Shannon encoding or Huffman encoding.

A first inverse quantization unit 212, a first inverse transform unit 214, a first reconstruction unit 216, and a first reference information adaptation unit 218 are units corresponding to a reconstruction path. A reference frame is obtained by reconstructing a frame by using units of the reconstruction path, so that reference frames in encoding and decoding can be kept consistent. A step performed by the first inverse quantization unit 212 is to perform an inverse process of quantization. A step performed by the first inverse transform unit 214 is an inverse process of transform performed by the transform unit 210. The first reconstruction unit 216 is configured to add residual data obtained through inverse transform and predicted data to obtain a reconstructed reference frame. The first reference information adaptation unit 218 is configured to perform, at a resolution of a current frame, adaptive processing on at least one type of the following reference information: a reference frame obtained through reconstruction, location information corresponding to each coded block of the current frame, location information corresponding to each reference block in the reference frame, and a motion vector, so that the first prediction unit 206 performs prediction according to the reference information on which adaptation is performed.

Figure 3:
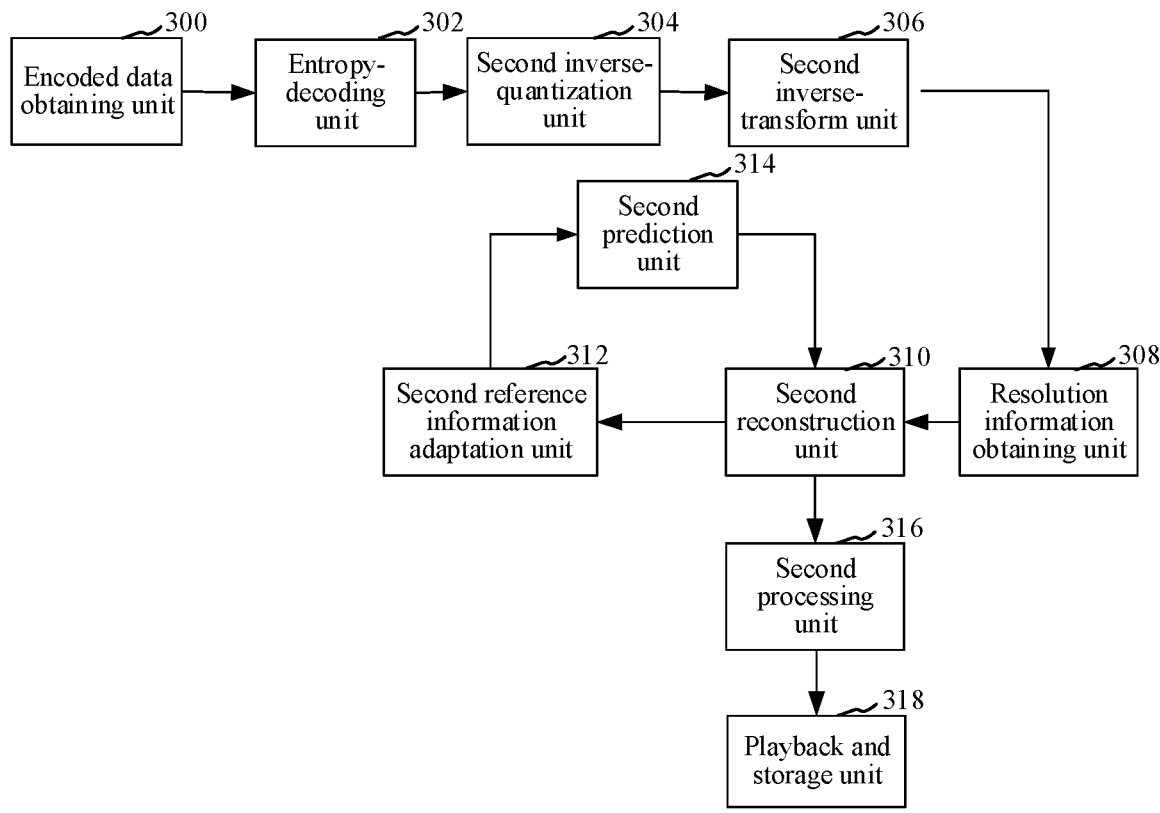
FIG. 3 is a diagram of a decoding framework corresponding to a video decoding method in an embodiment of this application.

FIG. 3 is a diagram of a decoding framework corresponding to a video decoding method according to an embodiment. According to the video decoding method provided in this embodiment of this application, encoded data corresponding to each current frame of a video sequence to be decoded may be obtained by using an encoded data obtaining unit 300, entropy-encoded data is obtained after a entropy-encoding unit 302 performs entropy-encoding, a second inverse quantization unit 304 performs inverse quantization on the entropy-encoded data to obtain inverse-quantized data, a second inverse transform unit 306 performs inverse transform on the reverse-quantized data, to obtain inverse-transformed data. The inverse-transformed data may be consistent with data obtained after inverse transform is performed by the first inverse transform unit 214 in FIG. 2. A resolution information obtaining unit 308 is configured to obtain resolution information corresponding to the current frame.

A second reference information adaptation unit 312 is configured to: obtain the reference frame obtained through reconstruction performed by a second reconstruction unit 310, and perform, according to the resolution information of the current frame, adaptive processing on at least one type of the following reference information: the reference frame, location information corresponding to each current block of the current frame, location information corresponding to each reference block in the reference frame, and a motion vector, so that the prediction is performed according to the information on which adaptive processing is performed. A second prediction unit 314 obtains a reference block corresponding to the current block according to the reference information obtained after adaptive processing is performed, and obtains a predicted value consistent with the predicted value in FIG. 2 according to an image value of the reference block. The second reconstruction unit 310 performs reconstruction according to the predicted value and inverse-transformed data (that is, the prediction residual) to obtain a reconstructed video frame. A second processing unit 316 processes the reconstructed video frame according to the resolution information corresponding to the current frame, to obtain a corresponding decoded video frame. A playback and storage unit 318 may play or store the decoded video frame, or play and store the decoded video frame.

It may be understood that the foregoing diagram of an encoding framework and the foregoing diagram of a decoding framework are merely an example, and do not constitute a limitation to the encoding method to which the solution of this application is applied. The diagram of an encoding framework and the diagram of a decoding framework may include more or fewer units than those shown in the figure, or some units may be combined, or a different component or unit deployment may be used. For example, loop-filtering may alternatively be performed on the reconstructed video frame, to reduce blocking effects of the video frame, thereby improving video quality.

Figure 4:
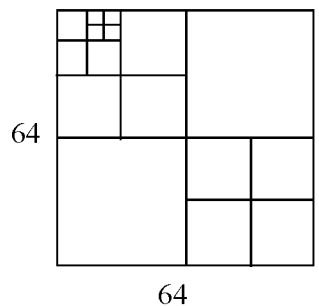
FIG. 4 is a schematic diagram corresponding to a coded block in an embodiment of this application.

A current frame may be divided into a plurality of coded blocks, and a size of a coded block may be set or calculated according to a requirement. For example, the sizes of the coded blocks may all be 8*8 pixels. Alternatively, a dividing manner with a small rate-distortion cost may be selected by calculating rate-distortion costs corresponding to various dividing manners of coded blocks, to perform division of the coded blocks. FIG. 4 is a schematic diagram of dividing an image block of 64*64 pixels. One block represents one coded block. It can be learned from FIG. 4 that, sizes of coded blocks may include 32*32 pixels, 16*16 pixels, 8*8 pixels, and 4*4 pixels. Certainly, sizes of coded blocks may alternatively be other sizes such as 32*16 pixels or 64*64 pixels. It may be understood that, during decoding, because coded blocks one-to-one correspond to current blocks, sizes of pixels of the current blocks may include 32*32 pixels, 16*16 pixels, 8*8 pixels, 4*4 pixels, and the like.

In a possible application scenario, the video encoding method and the video decoding method provided in the embodiments of this application may be applied to an application program having a video call function. The application program may be a social application program or an instant messaging application program. During a process in which two terminals on which the application program is installed make a video call, a first terminal captures a video frame by using a camera, then encodes the video frame by using a video encoding function of the application program to obtain encoded data, and sends the encoded data to a backend server of the application program. The backend server forwards the encoded data to a second terminal. After receiving the encoded data, the second terminal decodes the encoded data by using a video decoding function of the application program to obtain a video frame through reconstruction, and further, displays the video frame. Similarly, the second terminal may send encoded data obtained through encoding to the first terminal through the backend server, and the first terminal decodes and displays the encoded data. Therefore, the video call between the two parties is implemented.

In another possible application scenario, the video encoding method and the video decoding method provided in the embodiments of this application may be applied to an application program having a video playback function. The application program may be a live video streaming application program, a short video application program, or a video playback application program. A terminal on which the application program is installed may capture frames of a video by using a camera, then encode the frames of the video by using a video encoding function of the application program to obtain encoded data, and send the encoded data to a backend server of the application program. When another terminal requests to watch the video, the backend server sends the encoded data of the video to the another terminal, and the application program in the another terminal decodes the encoded data for playing the video.

Certainly, the foregoing several possible application scenarios are merely used for exemplary description, the video encoding method and the video decoding method provided in the embodiments of this application may alternatively be applied to other scenarios in which video encoding and decoding are needed. No limitation is imposed in the embodiments of this application.

Figure 5:
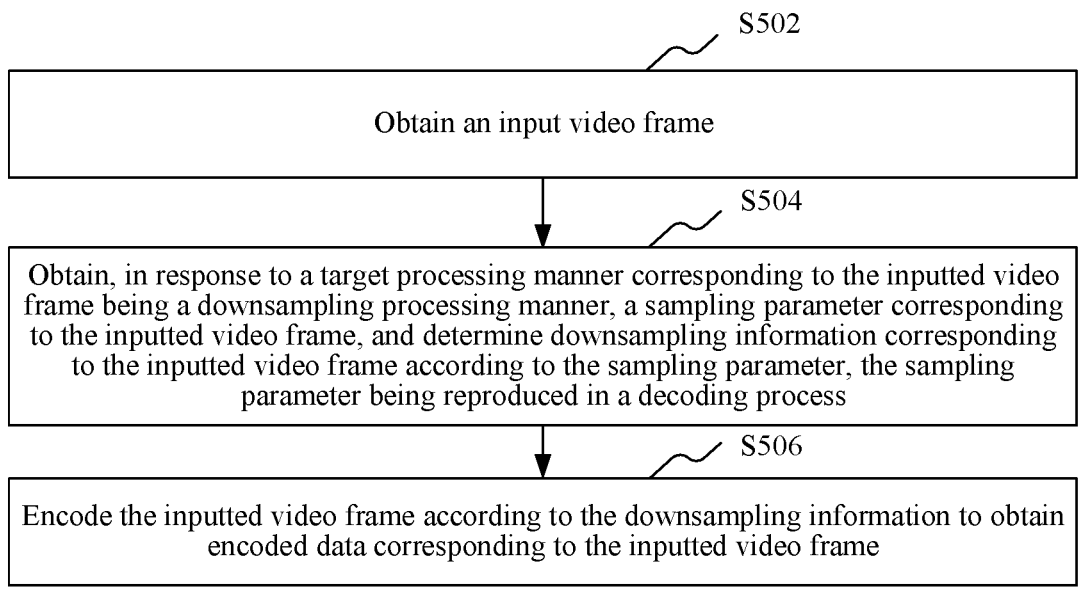
FIG. 5 is a flowchart of a video encoding method in an embodiment of this application.

As shown in FIG. 5, in an embodiment, a video encoding method is provided. The video encoding method not only can be applied to a server, but also can be applied to a terminal. In this embodiment, an example in which the video encoding method is applied to a terminal is used for description. The video encoding method specifically includes the following steps.

Step S502: Obtain an input video frame.

A video includes one video frame after another video frame, and during encoding, encoding needs to be performed on each video frame. The input video frame is a current frame to be encoded. The input video frame may be a video frame captured in real time, for example, a video frame for instant messaging. The input video frame may alternatively be a video frame corresponding to a stored video.

Step S504: Obtain, in a case that a target processing method corresponding to the input video frame is determined as a downsampling processing method, a sampling parameter corresponding to the input video frame, and determine downsampling information corresponding to the input video frame according to the sampling parameter, the sampling parameter being reproduced in a decoding process.

The sampling parameter is a parameter used for determining the downsampling information, and that the sampling parameter is reproducible in the decoding process means that the sampling parameter can be obtained or generated in the decoding process, so that the downsampling information does not need to be carried in encoded data, and after obtaining a sampling parameter the same as that on an encoding end, the decoding end can determine downsampling information consistent with that on the encoding end. A specific used sampling parameter may be customized according to requirements provided that it is ensured that the sampling parameter is reproducible on the decoding end. For example, the sampling parameter may include a frame type of a preceding video frame or an input video frame, or include a sampling parameter, such as encoded information of a preceding video frame, that is reproducible on the decoding end. Pieces of information of the sampling parameter that is reproducible in the decoding process are all pieces of information that exist in a bitstream or information that can be derived from information encoded in a bitstream, but if some pieces of information are all non-optimal choices in many attempts and search processes performed on the encoding end, the information is not reproduced on the decoding end. Such information is considered to be irreproducible in the decoding process.

The target processing method is selected from candidate processing methods. The candidate processing methods may include a full-resolution processing method and a downsampling processing method. The full-resolution processing method means performing full-resolution processing on an input video frame, to obtain a current frame. Moreover, the downsampling processing method means downsampling an input video frame, to obtain a current frame. For example, when the resolution of the input video frame is 800*800 pixels, and the processing method is that 2× downsampling is performed in both the horizontal direction and the vertical direction, a resolution of the current frame obtained through downsampling is 400*400 pixels.

The downsampling information includes at least one of: a downsampling proportion and a downsampling method. A downsampling proportion and/or a downsampling method corresponding to the input video frame are or is determined according to the sampling parameter. The downsampling method includes: horizontal (width) downsampling, vertical (height) downsampling, and horizontal and vertical downsampling. The downsampling proportion is a ratio of a resolution before sampling to a resolution after sampling, and includes a horizontal downsampling proportion and a vertical downsampling proportion. The sampling proportion may be represented by a ratio of a resolution after sampling to a resolution before the sampling, or may be represented by a ratio of a resolution before sampling to a resolution after sampling. For example, during horizontal downsampling, when a resolution after horizontal downsampling is one half of that before the horizontal downsampling, the sampling proportion (or ratio) may be ½ which is based a ratio of a resolution after sampling to a resolution before the sampling, and the sampling proportion (ratio) may be 2 which is based on a ratio of a resolution before sampling to a resolution after sampling.

For clear descriptions, the downsampling proportion and an upsampling proportion in the following each are represented by a ratio of a resolution before sampling to a resolution after sampling.

The downsampling proportion includes: a vertical (height) downsampling proportion and a horizontal (width) downsampling proportion. For example, 2× horizontal (width) downsampling is performed on the input video frame, a width of an image after sampling is a half of that of the original input video frame. If both 2× width downsampling and 2× height downsampling are performed on the input video frame, a width and a height after sampling are respectively a half of the original width and a half of the original height, and a resolution after sampling is ¼ of the original resolution. To adaptively select a downsampling proportion, a plurality of downsampling proportions may be preset for selection, for example, 2× width downsampling× 2× height downsampling, 3× width downsampling×3× height downsampling, 4× width downsampling×4× height downsampling, and 2× width downsampling×3× height downsampling. In an embodiment, selection of the downsampling proportion is related to a frame type of the input video frame. If the frame type is a B-frame, a relatively high downsampling proportion is likely to be selected. Because a P-frame may serve as a reference frame of the B-frame, and image quality of the P-frame affects image quality of a subsequent B-frame, if the frame type is a p-frame, a relatively low downsampling proportion is likely to be selected.

The downsampling method is a specific used sampling method. Common sampling methods include: point sampling, direct averaging, a filter, bilinear interpolation, bicubic interpolation, a convolutional neural network (CNN)-based algorithm, a method based on statistical characteristics, and the like. Different sampling methods correspond to different computational complexity. In an embodiment, selection of the downsampling method is related to an application type. Applications are classified into a real-time application type and a non-real-time application type. In a case of the real-time application type, a downsampling method with low computational complexity is likely to be selected. In a case of the non-real-time application type, a downsampling method with high computational complexity is likely to be selected.

Step S506: Encode the input video frame according to the downsampling information to obtain encoded data corresponding to the input video frame.

When the downsampling information includes a downsampling proportion, downsampling is performed on the input video frame according to the downsampling proportion to obtain the current frame, and then, the current frame is encoded to obtain the encoded data corresponding to the input video frame. The encoded data is data obtained after encoding. When the downsampling information further includes a downsampling method, the terminal downsamples the input video frame according to the downsampling method to obtain the current frame, and then, encodes the current frame to obtain the encoded data. When the downsampling information includes both a downsampling proportion and a downsampling method, the terminal first downsamples the input video frame according to the downsampling proportion to obtain the current frame, and then, encodes the current frame by using the downsampling method to obtain the encoded data corresponding to the input video frame.

In the foregoing video encoding method, an input video frame is obtained, a sampling parameter corresponding to the input video frame is obtained in a case that a target processing method corresponding to the input video frame is a downsampling processing method, the sampling parameter being reproduced in a decoding process, downsampling information corresponding to the input video frame is determined according to the sampling parameter, and then, the input video frame is encoded according to the downsampling information to obtain corresponding encoded data. In the foregoing encoding method, a sampling parameter is obtained, then downsampling information is determined according to the sampling parameter, and the sampling parameter is reproducible on a decoding end, so that more suitable downsampling information can be flexibly adaptively selected for each input video frame in an encoding process, thereby improving video quality at a limited bandwidth.

In an embodiment, the sampling parameter reproducible in the decoding process includes: the encoded data transmitted to the decoding end and/or processed data obtained according to the encoded data transmitted to the decoding end.

The sampling parameter corresponding to the input video frame may be, but is not limited to, any one or a combination of: first encoded data corresponding to the input video frame, second encoded data corresponding to a preceding video frame prior to the input video frame, processed data obtained according to the first encoded data and/or the second encoded data, and an image feature corresponding to a reconstructed video frame prior to the input video frame. The image feature is information related to image content, and includes one or more of image motion information and image texture information such as an edge. Specifically, when the sampling parameter corresponding to the input video frame is the first encoded data corresponding to the input video frame, the sampling parameter corresponding to the input video frame is determined as a parameter reproduced in the decoding process; when the sampling parameter corresponding to the input video frame is the second encoded data corresponding to the preceding video frame prior to the input video frame, the sampling parameter corresponding to the input video frame is determined as a parameter reproduced in the decoding process; when the sampling parameter corresponding to the input video frame is the processed data obtained according to the first encoded data and/or the second encoded data, the sampling parameter corresponding to the input video frame is determined as a parameter reproduced in the decoding process; and when the sampling parameter corresponding to the input video frame is the image feature corresponding to the reconstructed video frame prior to the input video frame, the sampling parameter corresponding to the input video frame is determined as a parameter reproduced in the decoding process.

Figure 6:
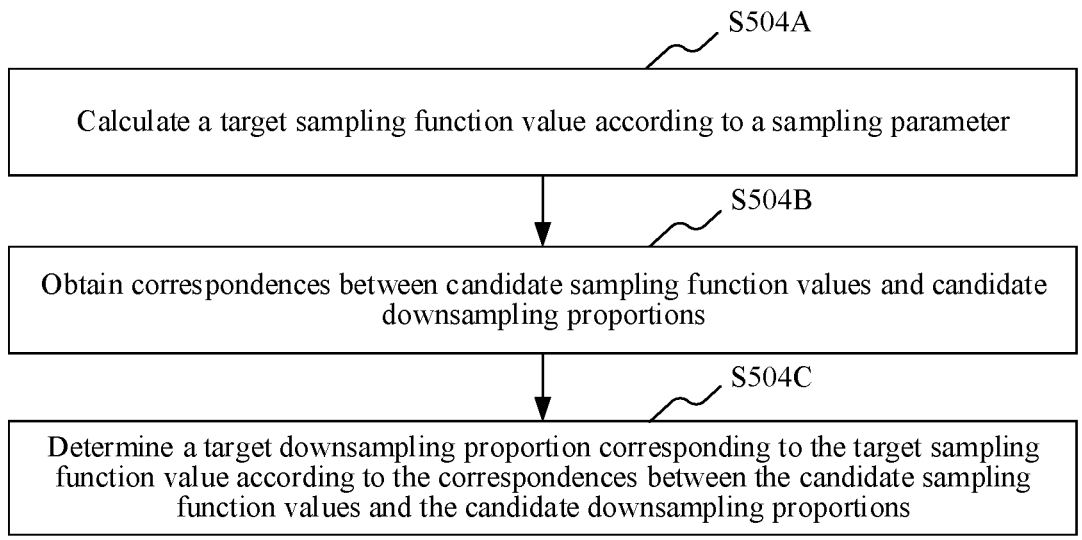
FIG. 6 is a flowchart of determining downsampling information corresponding to an input video frame in an embodiment of this application.

As shown in FIG. 6, in an embodiment, the downsampling information includes a downsampling proportion. The sampling parameter includes at least one of: frame information of the input video frame and encoding information of a preceding video frame corresponding to the input video frame. That the downsampling information corresponding to the input video frame is determined according to the sampling parameter includes:

Step S504A: Calculate a target sampling function value according to the sampling parameter.

The target sampling function value is a function value calculated by substituting the sampling parameter into a preset sampling function. The preceding video frame is a video frame that has been encoded before a current input video frame, a preceding video frame corresponding to the current video frame (input video frame) may be customized and selected, and there may be one preceding video frame or a plurality of preceding video frames. For example, a previous video frame of the current video frame may be used as a preceding video frame corresponding to the current video frame, or a plurality of previous video frames of the current video frame may be used as preceding video frames corresponding to the current video frame.

The sampling parameter includes at least one of: frame information of the current frame video frame and encoding information of a preceding video frame corresponding to the current video frame. The frame information includes at least one of a frame type, image feature information, and the like. The image feature information is a feature of an image corresponding to a video frame and includes a motion feature, a texture complexity feature, and the like. The encoding information includes at least one of: a frame type, a resolution, a code rate, a ratio of intra-coded blocks to inter-coded blocks (that is, an intraframe/interframe ratio), and the like. The obtained sampling parameter is substituted into a preset sampling fraction, so that a target sampling function value can be obtained.

Determining a downsampling proportion according to a sampling parameter is equivalent to determining resolution information corresponding to an input video frame according to a sampling parameter. In an embodiment, a resolution of the current video frame is positively correlated to a resolution of the preceding video frame. That is, a higher resolution of the preceding video frame indicates a higher resolution of the current video frame, and a corresponding downsampling proportion is to be lower. Because adjacent video frames are similar to each other in terms of texture and content as well as encoding complexity, resolutions of the adjacent video frames are also similar.

In another embodiment, a resolution of the current video frame is negatively correlated to a resolution of the preceding video frame. That is, a higher resolution of the preceding video frame indicates a lower resolution of the current video frame, and a corresponding downsampling proportion is to be higher. Because a high code rate of a preceding video frame indicates high difficulty in encoding of the frame, similarly, for a current frame, to decrease a code rate or improve encoding quality, a relatively small resolution is to be used in this case. That is, a relatively high downsampling proportion is selected.

In an embodiment, a resolution of the current video frame is negatively correlated to an intraframe/interframe ratio of the preceding video frame. That is, a higher intraframe/interframe ratio of the preceding video frame indicates a lower resolution of the current video frame and a higher downsampling proportion. Because a high intraframe/interframe ratio of a preceding video frame indicates high difficulty in interframe encoding of the frame and indicates that a correlation between frames of a part of the video sequence is not high, the current video frame is more dependent on intraframe encoding, and intra-frame encoding with a low resolution may be selected, that is, a downsampling proportion is high.

In an embodiment, the resolution of the current video frame is related to the frame type of the preceding video frame. If the frame type of the preceding video frame is an I-frame, a relatively high downsampling proportion is likely to be selected for the current video frame. If the frame type of the preceding video frame is a P-frame, a low downsampling proportion is likely to be selected. If the frame type of the preceding video frame is a B-frame, a lower downsampling proportion is likely to be selected.

The target sampling function value may be customized. For example, in an embodiment, if the sampling parameter is resolution information of the preceding video frame, the target sampling function value is set to be negatively correlated to the resolution information of the preceding video frame, that is, higher resolution information of the preceding video frame indicates a smaller target sampling function value, and then, a correspondence between the target sampling function value and the downsampling proportion is set to be, for example, that a smaller target sampling function value corresponds to a lower downsampling proportion.

Step S504B: Obtain correspondences between candidate sampling function values and candidate downsampling proportions.

A correspondence between a sampling function value and a downsampling proportion is preset, and when a target sampling function is calculated, a corresponding target downsampling proportion can be obtained directly.

In an embodiment, the sampling parameter includes: a resolution of the preceding video frame, a code rate of the preceding video frame, and an intraframe/interframe ratio of the preceding video frame. That is, the sampling function is a function correlated to the resolution of the preceding video frame, the code rate of the preceding video frame, and the intraframe/interframe ratio of the preceding video frame, and a corresponding target sampling function value can be obtained after the resolution of the preceding video frame, the code rate of the preceding video frame, and the intraframe/interframe ratio of the preceding video frame are obtained.

It is assumed that the resolution of the current video frame is positively correlated to the resolution of the preceding video frame, the resolution of the current video frame is negatively correlated to the code rate of the preceding video frame, and the resolution of the current video frame is negatively correlated to the intraframe/interframe ratio of the preceding video frame. If the sampling function value is set to be positively correlated to the downsampling proportion, that is, a larger sampling function value corresponds to a higher downsampling proportion, the resolution of the preceding video frame is negatively correlated to the sampling function value, the code rate of the preceding video frame is positively correlated to the sampling function value, and the intraframe/interframe ratio of the preceding video frame is positively correlated to the sampling function value. In an embodiment, a sampling function $F(S, B, R) = \alpha * S * B / R$ may be set, where S represents the intraframe/interframe ratio of the preceding video frame, B represents the code rate of the preceding video frame, R represents the resolution of the preceding video frame, and a is a constant.

Subsequently, a correspondence between the target sampling function value and the downsampling proportion is set. For example, when the target sampling function value falls within a range of $(0, T1]$, the downsampling proportion is set to 2, when the target sampling function value falls within a range of $(T1, T2]$, where $T2>T1>0$, the downsampling proportion is set to 3, and so on. The sampling function and a correspondence between the sampling function value and the downsampling proportion are set, subsequently, the target sampling function can be calculated according to the sampling parameter included in the sampling function, and then, the target downsampling proportion can be determined.

Step S504C: Determine a target downsampling proportion corresponding to the target sampling function value according to correspondences between the candidate sampling function values and the candidate downsampling proportions.

The target downsampling proportion is a downsampling proportion corresponding to the calculated target sampling function value, or a downsampling proportion corresponding to the input video frame. Subsequently, sampling is performed on the input video frame according to the target downsampling proportion to obtain the current frame, and then, the current frame is encoded to obtain the encoded data. Because the sampling parameter is reproducible on the decoding end, the target downsampling proportion can be calculated on the decoding end according to the same calculation method. In this way, the downsampling proportion can be adaptively selected without adding the downsampling information to the encoded data on the encoding end in advance, and then, encoding is performed according to the downsampling proportion, thereby improving video quality at a limited bandwidth.

In an embodiment, the encoding information of the preceding video frame includes resolution information of the preceding video frame. That the target sampling function value is calculated according to the sampling parameter includes: calculating the target sampling function value according to the resolution information of the preceding video frame.

If there is one preceding video frame, the resolution of the preceding video frame is a resolution used when the frame is encoded. If there are a plurality of preceding video frames, the resolution of the preceding video frame may be an average of resolutions of the plurality of frame video frames. Because the resolution of the preceding video frame is reproducible on the decoding end, the resolution of the preceding video frame may be used as the sampling parameter, and the target sampling function value is calculated according to the resolution information of the preceding video frame. In an embodiment, because adjacent video frames are similar to each other in terms of texture and content as well as encoding complexity, a resolution of the current video frame is positively correlated to a resolution of the preceding video frame. That is, a higher resolution of the preceding video frame indicates a higher resolution of the current video frame and a lower corresponding downsampling proportion. When the target sampling function value is negatively correlated to the downsampling proportion, correspondingly, the target sampling function value is positively correlated to the resolution of the preceding video frame. On the contrary, when the target sampling function value is positively correlated to the downsampling proportion, correspondingly, the target sampling function value is negatively correlated to the resolution of the preceding video frame.

In an embodiment, the encoding information of the preceding video frame further includes at least one of: a ratio of intra-coded blocks to inter-coded blocks of the preceding video frame, a frame type of the preceding video frame, and a code rate of the preceding video frame.

In addition to including the resolution information of the preceding video frame, the sampling parameter further includes at least one of parameters reproducible on the decoding end such as the ratio of intra-coded blocks to inter-coded blocks of the preceding video frame, the frame type of the preceding video frame, and the code rate of the preceding video frame. Corresponding downsampling information can be obtained, without adding the downsampling information to the encoded data, on the decoding end by using the downsampling information obtained according to the parameter reproduced on the decoding end, so that the downsampling information is adaptively selected to improve video quality at a limited bandwidth.

Figure 7:
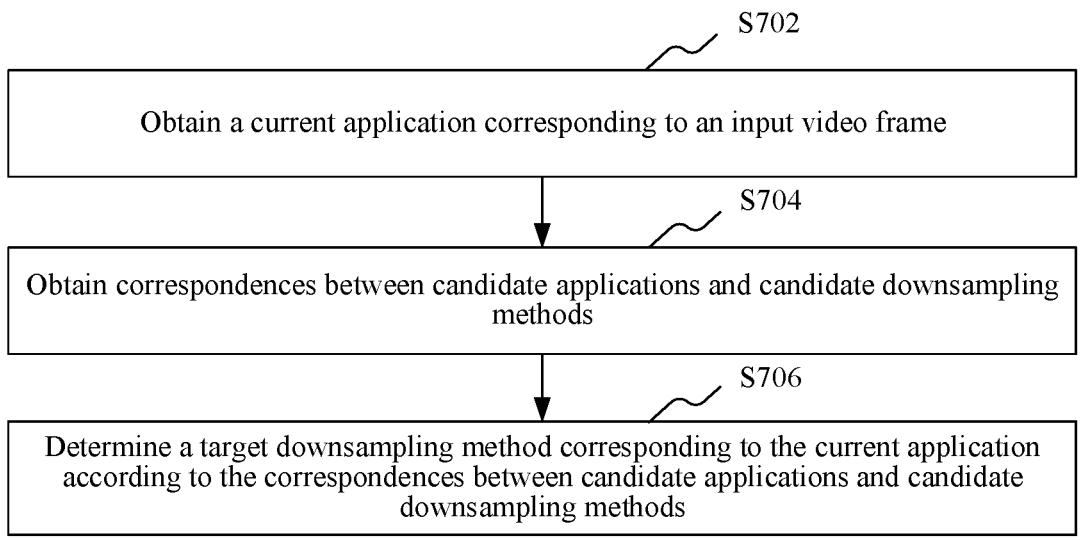
FIG. 7 is a flowchart of determining downsampling information corresponding to an input video frame in another embodiment of this application.

As shown in FIG. 7, in an embodiment, the downsampling information includes a downsampling method. Obtaining a sampling parameter corresponding to the input video frame, and determining downsampling information corresponding to the input video frame according to the sampling parameter includes the following steps.

Step S702: Obtain a current application corresponding to the input video frame.

The current application is an application program to which the input video frame currently belongs. Different applications have different requirements for a video. Some applications require real-time performance, that is, require a high encoding speed, and in this case, a downsampling method with low computational complexity is likely to be selected. Some applications require definition and have low real-time performance requirements, and in this case, a downsampling method with high computational complexity is likely to be selected.

Step S704: Obtain correspondences between candidate applications and candidate downsampling methods.

For different applications, correspondences between candidate applications and candidate downsampling methods are preset, and a corresponding downsampling method is selected by obtaining a current application corresponding to the input video frame. For example, it is assumed that there are three different applications, namely, an application A, an application B, and an application C. Because the application A requires a high encoding speed, a corresponding downsampling method 1 with low computational complexity is preset for the application A. The application B requires a speed as high as possible while ensuring encoding quality, and a downsampling method 2 with medium computational complexity may be set for the application B. The application C has no requirement on a speed and only has a requirement on definition of a video, and in this case, a downsampling method 3 with high computational complexity is set for the application C.

Step S706: Determine a target downsampling method corresponding to the current application according to the correspondences between candidate applications and candidate downsampling methods.

The target downsampling method corresponding to the current application is determined by obtaining the preset correspondences between the candidate applications and the candidate downsampling methods. The target downsampling method is a sampling method used for downsampling the input video frame. Downsampling the input video frame by using a suitable downsampling method helps to select, at a limited bandwidth, a most suitable downsampling method according to different applications and helps to improve encoding quality while improving an encoding speed.

Figure 8:
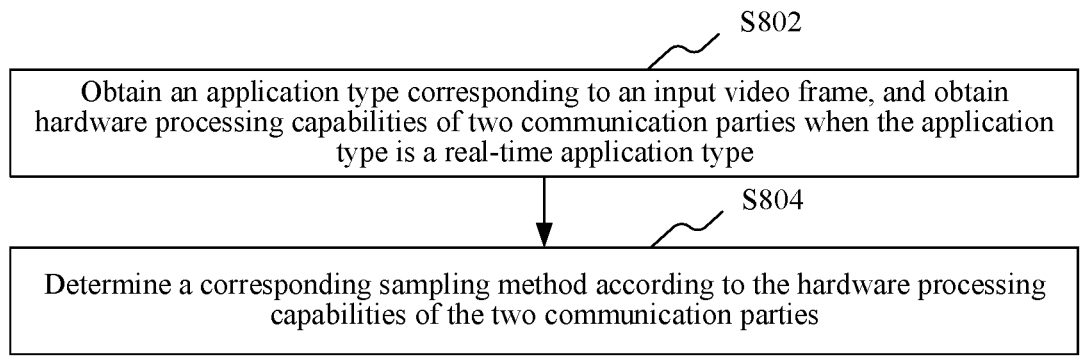
FIG. 8 is a flowchart of determining downsampling information corresponding to an input video frame in still another embodiment of this application.

As shown in FIG. 8, in an embodiment, the downsampling information includes a downsampling method. That the sampling parameter corresponding to the input video frame is obtained, and the downsampling information corresponding to the input video frame is determined according to the sampling parameter includes the following steps.

Step S802: Obtain an application type corresponding to the input video frame, and obtain hardware processing capabilities of two communication parties in a case that the application type is a real-time application type.

The application types are classified into real-time applications and non-real-time applications. When the application type is a real-time application type, for example, a video call is a real-time application type, and in this case, to obtain hardware processing capabilities of two communication parties is to obtain hardware processing capabilities of the encoding end and the decoding end. The hardware processing capability includes at least one of: CPU utilization, a quantity of cores of a CPU, a CPU memory, a clock speed, a system type, and a model type. The system type is a type of an operating system used by a current terminal, for example, an IOS system, an Android system, or a Windows system. When other conditions are the same, different systems correspond to different processing capabilities. Therefore, the system type may be used as a condition for determining a downsampling proportion. The CPU utilization, the quantity of cores of a CPU, the CPU memory, the clock speed, the model type, and the like are all parameters representing hardware processing capabilities. Generally, for a stronger processing capability, a lower downsampling proportion is likely to be selected, that is, a processed resolution is higher.

Step S804: Determine a corresponding sampling method according to the hardware processing capabilities of the two communication parties.

Hardware processing capabilities of the encoding end and the decoding end are obtained, and then, a corresponding sampling method is obtained according to the hardware processing capabilities of the two. In an embodiment, correspondences between candidate hardware processing capabilities and candidate downsampling methods are preset, and after the hardware processing capabilities of the encoding end and the decoding end are obtained, the corresponding downsampling method can be obtained. In another embodiment, computational complexity that can be afforded is calculated according to the hardware processing capabilities of the two communication parties, and then, a corresponding downsampling method is obtained according to the computational complexity. To meet the requirements of the two communication parties on real-time performance, the hardware processing capabilities of both the two communication parties are taken into consideration, to select a most suitable downsampling method for processing the input video frame, thereby improving a video encoding/decoding speed while ensuring video quality.

In an embodiment, the downsampling information includes a downsampling proportion; and encoding the input video frame according to the downsampling information to obtain encoded data corresponding to the input video frame includes: processing the input video frame according to the downsampling proportion to obtain a current frame; obtaining a reference frame corresponding to the current frame; and encoding the current frame according to the reference frame to obtain the encoded data corresponding to the input video frame.

Downsampling processing is performed on the input video frame according to the downsampling proportion to obtain a current frame. During encoding on an inter-coded frame, the encoding needs to be performed according to a reference frame. If the input video frame is an inter-coded frame, a reference frame corresponding to the current frame also needs to be obtained, and then, the current frame is encoded according to the reference frame, to obtain encoded data corresponding to the input video frame.

In an embodiment, encoding the current frame according to the reference frame to obtain the encoded data corresponding to the input video frame includes: obtaining the downsampling proportion corresponding to the current frame, and processing the reference frame according to the downsampling proportion to obtain a target reference frame; and encoding the current frame according to the target reference frame to obtain the encoded data corresponding to the input video frame.

For better reference and encoding, a resolution of the reference frame and a resolution of the current frame are processed to be consistent. After the downsampling proportion corresponding to the current frame is obtained, sampling is performed on reference frame according to the downsampling proportion. In a case that the original resolution of the input video frame and the downsampling proportion are known, the resolution information of the current frame can obviously be obtained. When the resolution of the reference frame is lower than the resolution of the current frame, upsampling is performed on the reference frame to obtain a target reference frame. When the resolution of the reference frame is higher than the resolution of the current frame, downsampling needs to be performed on the reference frame, to obtain a target reference frame, and then, the current frame is encoded according to the target reference frame, to obtain the encoded data corresponding to the input video frame.

In an embodiment, the downsampling information further includes a downsampling method; and processing the input video frame according to the downsampling proportion to obtain a current frame includes: downsampling the input video frame according to the downsampling proportion by using the downsampling method to obtain the current frame.

To reduce a volume of encoded data and improve an encoding speed, downsampling processing needs to be performed on the input video frame before encoding, and before downsampling is performed on the input video frame, a corresponding downsampling proportion is first obtained, downsampling is performed on the input video frame according to the downsampling proportion to obtain the current frame, and in addition, to downsample the input video frame, a corresponding downsampling method also needs to be determined, and then, downsampling is performed on the input video frame according to the downsampling method, to obtain the current frame to be decoded.

Figure 9:
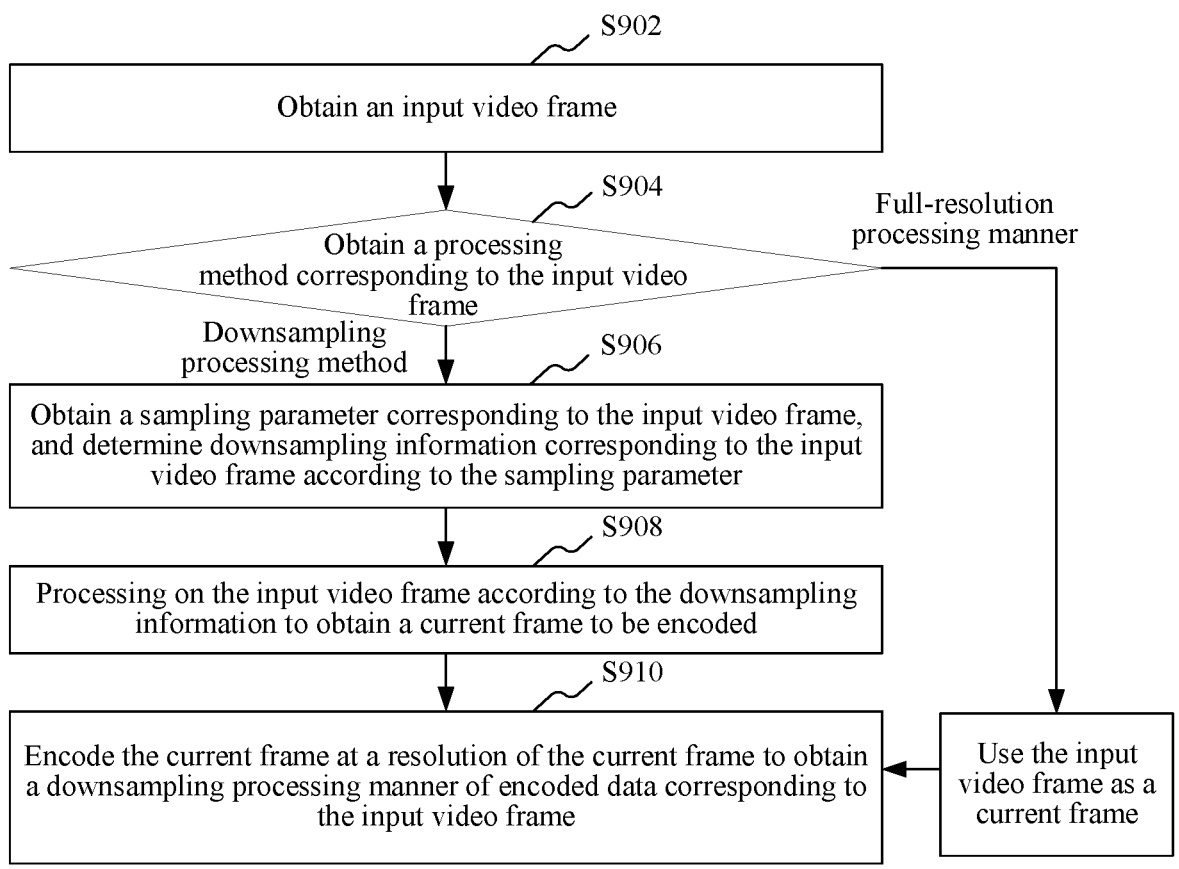
FIG. 9 is a flowchart of a video encoding method in another embodiment of this application.

As shown in FIG. 9, in an embodiment, a video encoding method is provided, including the following steps.

Step S902: Obtain an input video frame.

Step S904: Obtain a processing method corresponding to the input video frame, in a case that the processing method is a downsampling processing method, perform step S906, and in a case that the processing method is a full-resolution processing method, directly use the input video frame as a current frame and perform step S910.

The processing method corresponding to the input video frame may be selected from the candidate processing methods, and the candidate processing methods may include the full-resolution processing method and the downsampling processing method. A method for obtaining the processing method corresponding to the input video frame may be set according to an actual requirement. For example, a processing parameter corresponding to the input video frame may be obtained, and the corresponding processing method is obtained according to the processing parameter. The processing method is a parameter used for determining the processing method. The processing parameter specifically adopted may be set according to a requirement. For example, the processing parameter may include at least one of current encoding information corresponding to the input video frame and an image feature.

In an embodiment, the processing method corresponding to the input video frame may be obtained according to at least one of the current encoding information corresponding to the input video frame and image feature information. The current encoding information is video compression parameter information obtained during encoding on a video, for example, one or more of a frame prediction-type, a motion vector, a quantization parameter, a video source, a code rate, a frame rate, and a resolution.

The image feature information is information related to image content, and includes one or more of image motion information and image texture information such as an edge. The current encoding information and the image feature information reflect a scene, detail complexity, motion intensity, or the like corresponding to a video frame. For example, a motion scene can be determined by using one or more of a motion vector, a quantization parameter, or a code rate. A large quantization parameter generally indicates an intense motion, and a large motion vector indicates that an image scene is a large motion scene. Determining may alternatively be performed according to a ratio of a code rate of an encoded I-frame to that of an encoded P-frame or a ratio of the code rate of the encoded I-frame to that of an encoded B-frame.

When the ratio exceeds a first preset threshold, an image is determined as a still image, and when the ratio is less than a second preset threshold, an image is determined as an image with high motion intensity. Alternatively, a target object is directly tracked according to image content, and whether a scene is a large motion scene is determined according to a motion speed of the target object. A fixed code rate indicates a fixed amount of information that can be expressed. For a scene with high motion intensity, an amount of information in a temporal domain is large, and accordingly, a code rate that can be used for expressing information in a spatial domain is small. Therefore, a relatively good image quality effect can be achieved by using a low resolution, and a downsampling mode is more likely to be selected for encoding. An image switching scenario may be determined according to the frame prediction-type, and a preferred encoding mode may alternatively be determined according to impact of the frame prediction-type on other frames.

For example, an I-frame is generally a first frame or indicates existence of screen switching. Because quality of an I-frame affects quality of a subsequent P-frame or B-frame, compared with an inter-predicted frame, the full-resolution processing method is more likely to be selected for an intra-predicted frame, to ensure image quality. The P-frame may be used as a reference frame of the B-frame, and image quality of the P-frame affects image quality of the subsequent B-frame. Therefore, the full-resolution processing method is more likely to be selected in encoding by using the P-frame compared with encoding by using the B-frame. Texture complexity of the current frame to be encoded is determined according to the image feature information, for example, image texture information. If texture is complex and includes a large quantity r of details, there is a large amount of spatial domain information of the image. If downsampling is performed, a relatively large amount of detailed information may be lost due to the downsampling, and video quality is affected. Therefore, full-resolution processing is more likely to be selected for a current frame to be encoded having complex texture compared with a current frame to be encoded having simple texture.

In an embodiment, the resolution corresponding to the input video frame may be obtained according to a size relationship between a current quantization parameter corresponding to the input video frame and a quantization parameter threshold. If the current quantization parameter is greater than the quantization parameter threshold, the processing method is determined as the downsampling processing method, and otherwise, the processing method is determined as the full-resolution processing method. The quantization parameter threshold may be obtained according to a proportion of an intra-coded block of a forward-encoded video frame that has been encoded before the input video frame.

A correspondence between a proportion of an intra-predicted block and a quantization parameter threshold may be preset, so that a quantization parameter threshold corresponding to a proportion of an intra-predicted block may be determined according to the correspondence after the proportion of the intra-predicted block of the forward-encoded frame is determined. For encoding with a fixed quantization parameter, the current quantization parameter may be a corresponding fixed quantization parameter value. For encoding at a fixed code rate, the current quantization parameter corresponding to the input video frame may be calculated according to a code rate control model. Alternatively, a quantization parameter corresponding to a reference frame may be used as the current quantization parameter corresponding to the input video frame. In this embodiment of this application, a larger current quantization parameter generally indicates a more intense motion, the downsampling processing method is more likely to be selected for a scene with an intense motion.

In an embodiment, a relationship between the proportion of the intra-predicted block and the quantization parameter threshold is a positive correlation. For example, according to experience, a correspondence between a proportion Intra0 of an intra-predicted block and a quantization parameter threshold QPTH is:

$$QP_{TH} = \begin{cases} 33, & Intra_0 < 10\% \\ 31, & 10\% \leq Intra_0 < 50\% \\ 29, & Intra_0 \geq 50\% \end{cases} \quad (Eq.\ 1)$$

Step S906: Obtain a sampling parameter corresponding to the input video frame, and determine downsampling information corresponding to the input video frame according to the sampling parameter.

The sampling parameter is reproduced in a decoding process.

Step S908: Processing on the input video frame according to the downsampling information to obtain a current frame.

The current frame is obtained by performing processing on the input video frame according to the downsampling information. When the processing method includes a downsampling processing method, downsampling processing may be performed on an input video frame according to the downsampling information, to obtain a current frame. For example, when the resolution of the input video frame is 800*800 pixels, and the processing method is that 2/1 downsampling is performed in both the horizontal direction and the vertical direction, a resolution of the current frame obtained through downsampling is 400*400 pixels.

Step S910: Encode the current frame at a resolution of the current frame to obtain encoded data corresponding to the input video frame.

Encoding may include at least one of prediction, transform, quantization, and entropy encoding. When the current frame is an I-frame, intra-prediction is performed on the current frame at the resolution of the current frame. When the current frame is a P-frame or a B-frame, a reference frame corresponding to the current frame may be obtained, prediction is performed according to the reference frame to obtain a prediction residual, and transform, quantization, and entropy encoding are performed on the prediction residual, to obtain the encoded data corresponding to the input video frame.

In a process of obtaining the encoded data, at least one of the reference frame, location information corresponding to each coded block of the current frame, location information corresponding to each reference block in the reference frame, and a motion vector is processed according to the resolution of the current frame. For example, during calculation of the prediction residual, the reference frame may be processed according to the resolution information of the current frame, to obtain the target reference frame, and a target reference block corresponding to each code block in the current frame is obtained from the target reference frame, and prediction is performed according to the target reference block, to obtain a predicted value corresponding to the code block, and then the prediction residual is obtained according to a difference between an actual value of the code block and the predicted value.

During calculation of the target motion vector, if the resolution of the reference frame is different from the resolution of the current frame, location information of the coded block or location information of a decoded block may be transformed according to the resolution information of the reference frame and the resolution information of the current frame, so that the location information of the current frame and the location information of the reference frame are in a same quantization scale. Subsequently, the target motion vector is obtained according to the transformed location information, to reduce a value of the target motion vector, and reduce a data amount of the encoded data. Alternatively, if the resolution information corresponding to the target motion vector is different from the resolution information of the current frame, when the first motion vector corresponding to a coded block of the current frame is calculated at the resolution of the current frame, the first motion vector is transformed according to the resolution information of the current frame and the resolution information of the target motion vector, to obtain the target motion vector at a target resolution. For example, it is assumed that the resolution of the current frame is 400*800 pixels and the resolution of the reference frame is 800*1600 pixels. Then, 2/1 downsampling may be performed on the reference frame according to the resolution of the current frame, to obtain that the resolution of the target reference frame is 400*800 pixels, and then video encoding is performed according to the target reference frame.

In this embodiment, when the obtained processing method is a downsampling processing method, downsampling information also needs to be obtained, the downsampling information being determined according to a sampling parameter, then, the input video frame is processed according to the downsampling information to obtain a current frame, and the current frame is encoded at a resolution of the current frame to obtain encoded data. The processing method and the downsampling information are flexibly selected, so that a resolution of the input video frame and a volume of the data to be encoded can be adaptively adjusted, thereby improving video quality at a limited bandwidth.

In an embodiment, encoding the current frame at a resolution of the current frame, to obtain encoded data corresponding to the input video frame includes: adding processing method information corresponding to a processing method to the encoded data corresponding to the input video frame.

The processing method information is used for describing the processing method adopted for the input video frame. A flag bit Frame_Resolution_Flag describing the processing method may be added to the encoded data, that is, a syntax element describing the processing method information is added to the encoded data. A value of a flag bit corresponding to each processing method may be set according to a requirement. For example, when the processing method is the full-resolution processing method, the corresponding Frame_Resolution_Flag may be 0, and when the processing method is the downsampling processing method, the corresponding Frame_Resolution_Flag may be 1.

In an embodiment, the processing method information is added to frame-level header information corresponding to the encoded data, for example, to a preset location of the frame-level header information. The frame-level header information is header information of encoded data corresponding to an input video frame, a sequence-level header information is header information of encoded data corresponding to a video sequence, and a group-level header information is header information of encoded data corresponding to a group of pictures (GOP). One video frame sequence may include a plurality of groups of pictures, and one group of pictures may include a plurality of video frames.

Figure 10:
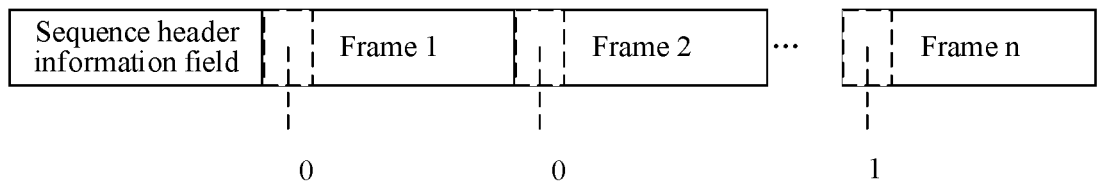
FIG. 10 is a schematic diagram of encoded data in an embodiment of this application.

In FIG. 10, blocks indicated by dashed lines represent frame-level header information of encoded data corresponding to each input video frame, and frames respectively represent encoded data corresponding to the first, second, and $n^{th}$ video frames. In FIG. 10, processing methods corresponding to the first input video frame and the second input video frame are the full-resolution processing method, and a processing method corresponding to the third input video frame is the downsampling processing method.

In an embodiment, downsampling processing method information of downsampling the input video frame may be further added to encoded data corresponding to the input video frame, to enable the decoding end to obtain, according to the downsampling processing method information when obtaining the encoded data, a corresponding method for upsampling a reconstructed video frame and an upsampling proportion. The downsampling processing method information includes at least one of downsampling method information and downsampling proportion information. A location for adding the downsampling method information to the encoded data may be one of corresponding group-level header information, sequence-level header information, and frame-level header information. The location for adding the downsampling method information in the encoded data may be determined according to an action range corresponding to the downsampling method. A location for adding the downsampling proportion information to the encoded data may be any one of the corresponding group-level header information, sequence-level header information, and frame-level header information. The location for adding the downsampling proportion information to the encoded data may be determined according to an action range corresponding to the downsampling proportion, and the action range is an applicable range. For example, if the action range of the downsampling proportion is a GOP, downsampling proportion information corresponding to the GOP may be added to header information corresponding to the GOP. If the action range of the downsampling proportion is a video sequence, the downsampling proportion information is added to sequence-level header information corresponding to the video sequence, to indicate that downsampling is performed on each video frame of the video sequence by using the downsampling proportion corresponding to the downsampling proportion information.

In an embodiment, obtaining a processing method corresponding to the input video frame includes: obtaining a processing parameter corresponding to the input video frame, and determining the processing method corresponding to the input video frame according to the processing parameter. Adding the processing method information corresponding to the processing method to the encoded data corresponding to the input video frame includes: adding, when a processing parameter is irreproducible in the decoding process, the processing method information corresponding to the processing method to the encoded data corresponding to the input video frame.

The processing parameter may include at least one of image encoding information corresponding to the input video frame and image feature information. That the processing parameter is irreproducible in the decoding process means that the processing parameter cannot be obtained or generated in the decoding process. For example, if the processing parameter is information corresponding to image content of the input video frame, and there is a loss of image information in the encoding process, a decoded video frame on the decoding end differs from the input video frame. Therefore, information corresponding to the image content of the input video frame is not obtained in the decoding process. That is, the information corresponding to the image content is irreproducible in the decoding process. A rate-distortion cost needs to be calculated in the encoding process, but the rate-distortion cost is not calculated in the decoding process. Therefore, if the processing parameter includes a rate-distortion cost, the processing parameter is irreproducible in the decoding process. Because peak signal to noise ratio (PSNR) information of the reconstructed video frame and PSNR information of the input video frame that are obtained in the encoding process cannot be obtained in the decoding process, the PSNR information is irreproducible in the decoding process.

In an embodiment, when the processing parameter is reproducible on the decoding end, the processing method information corresponding to the processing method may be added to the encoded data corresponding to the input video frame, or the processing method information corresponding to the processing method may not be added to the encoded data corresponding to the input video frame. When the processing method information corresponding to the processing method is added to the encoded data corresponding to the input video frame, the decoding end may read the processing method information from the encoded data without obtaining the processing method according to the processing parameter. When the processing method information corresponding to the processing method is not added to the encoded data corresponding to the input video frame, a decoding device determines, according to the processing parameter, a processing method consistent with that on the encoding end, to reduce an amount of the encoded data.

Figure 11:
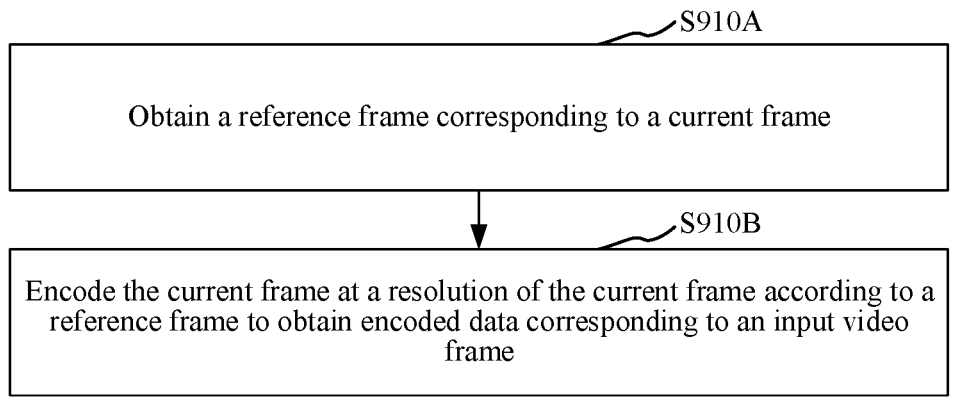
FIG. 11 is a flowchart of encoding a current frame to obtain encoded data in an embodiment of this application.

In an embodiment, as shown in FIG. 11, step S910, that is, encoding the current frame at a resolution of the current frame to obtain encoded data corresponding to the input video frame, includes the following steps.

Step S910A: Obtain a reference frame corresponding to the current frame.

The reference frame is a video frame that needs to be referred to when the current frame is encoded, and the reference frame is a video frame obtained through reconstructing data that has been obtained through encoding before the current frame. There may be one or more reference frames corresponding to the current frame. For example, when the current frame is a P-frame, there may be one corresponding reference frame, and when the current frame is a B-frame, there may be two corresponding reference frames. A reference frame corresponding to the current frame may be obtained according to a reference relationship, and the reference relationship is determined according to each video encoding and decoding standard. For example, when the second video frame in a GOP is a B-frame, reference frames corresponding thereto may be an I-frame of the GOP and the third frame of the GOP, or may be the first frame and the fourth frame. Details may be customized.

In an embodiment, the obtaining a reference frame corresponding to the current frame includes: obtaining a first reference rule, the first reference rule including a size relationship between a resolution of the current frame and a resolution of the reference frame; and obtaining the reference frame corresponding to the current frame according to the first reference rule.

The first reference rule determines the size relationship between the resolution of the current frame and the resolution of the reference frame, and the size relationship between the resolutions includes at least one of that the resolution of the current frame is the same as the resolution of the reference frame and that the resolution of the current frame is different from the resolution of the reference frame. When the first reference rule includes that the resolution of the current frame is the same as the resolution of the reference frame, the first reference rule may further include a processing method reference rule of the resolution of the current frame and the reference frame. For example, the processing method reference rule may include one or two of the following: for a current frame in a full-resolution processing method, a reference frame in a full-resolution processing method may be referred to, and for a current frame in a downsampling processing method, a reference frame in a downsampling processing method may be referred to. When the first reference rule includes that the resolution of the current frame is different from the resolution of the reference frame, the first reference rule may further include one or more of that the resolution of the current frame is higher than the resolution of the reference frame and that that the resolution of the current frame is lower than the resolution of the reference frame. Therefore, in an embodiment, the first reference rule may specifically include one or more of the following: for a current frame with an original resolution, a reference frame with a downsampling resolution may be referred to, for a current frame with a downsampling resolution, a reference frame with an original resolution may be referred to, for a current frame with an original resolution, a reference frame with an original resolution may be referred to, and for a current frame with a downsampling resolution, a reference frame with a downsampling resolution may be referred to. The current frame with an original resolution indicates that the resolution of the current frame is the same as the resolution of the input video frame corresponding to the current frame, and the reference frame with an original resolution indicates that the resolution of the reference frame is the same as the resolution of the input video frame corresponding to the reference frame. The current frame with a downsampling resolution indicates that the current frame is obtained by downsampling the corresponding input video frame. The reference frame with a downsampling resolution indicates that the reference frame is obtained by downsampling the corresponding input video frame. After the first reference rule is obtained, the reference frame corresponding to the current frame is obtained according to the first reference rule, so that the obtained reference frame meets the first reference rule.

In an embodiment, step S910, that is, encoding the current frame at a resolution of the current frame, to obtain encoded data corresponding to the input video frame includes: adding rule information corresponding to the first reference rule to the encoded data corresponding to the input video frame.

The rule information is used to describe an adopted reference rule, and a flag bit Resolution_Referencer_Rules describing the reference rule may be added to the encoded data. A reference rule represented by a specific value of the flag bit may be set according to a requirement. A location for adding the rule information to the encoded data may be one or more of group-level header information, sequence-level header information, and frame-level header information. The location for adding the rule information to the encoded data may be determined according to an action range of the first reference rule. For example, when the first reference rule is that for a current frame with an original resolution, a reference frame with a downsampling resolution may be referred to, the corresponding Resolution_Referencer_Rules may be 1. When the first reference rule is that for a current frame with a downsampling resolution, a reference frame with a downsampling resolution may be referred to, the corresponding Resolution_Referencer_Rules may be 2. If the same first reference rule is used for the video sequence, the location for adding the rule information to the encoded data may be the sequence-level header information. If the first reference rule is a reference rule used for one GOP therein, the location for adding the rule information to the encoded data is group-level header information corresponding to the GOP for which the first reference rule is used.

Step S910B: Encode the current frame at a resolution of the current frame according to a reference frame to obtain encoded data corresponding to the input video frame.

The reference frame corresponding to the current frame may be obtained, prediction is performed according to the reference frame to obtain a prediction residual, and transform, quantization, and entropy encoding are performed on the prediction residual to obtain the encoded data corresponding to the input video frame. In a process of obtaining the encoded data, at least one of a reference frame, location information corresponding to each coded block of the current frame, location information corresponding to each reference block in the reference frame, and a motion vector is obtained according to the resolution of the current frame. After the reference frame is obtained, a reference block corresponding to a coded block of the current frame may be obtained from the reference frame, and the coded block is encoded according to the reference block. Alternatively, the reference frame may be processed according to the resolution of the current frame, to obtain a corresponding target reference frame, a target reference block corresponding to the coded block of the current frame is obtained from the target reference frame, and the coded block is encoded according to the target reference block, to obtain the encoded data corresponding to the input video frame.

In an embodiment, encoding the current frame at a resolution of the current frame, to obtain encoded data corresponding to the input video frame includes: obtaining, at the resolution of the current frame, a corresponding encoding manner during encoding the current frame; and adding encoding manner information corresponding to the encoding manner to the encoded data corresponding to the input video frame.

The encoding manner is a processing method related to encoding. For example, the encoding manner may include one or more of an upsampling processing method used during encoding for a video frame obtained after decoding and reconstruction are performed on a reference frame, a rule corresponding to a reference rule, a sampling processing method for sampling the reference frame, and a resolution corresponding to a motion vector. The encoding manner information corresponding to the encoding manner is added to the encoded data corresponding to the input video frame, so that the encoded data corresponding to the current frame can be decoded according to the encoding manner information during decoding.

In an embodiment, alternatively, the encoding manner information corresponding to the encoding manner may not be added to the encoded data. Instead, an encoding manner is set in an encoding and decoding standard, and a decoding manner corresponding to the encoding manner is set on the decoding end. Alternatively, the encoding end and the decoding end may calculate, according to same or corresponding algorithms, an encoding manner and a decoding manner that match each other. For example, the method for upsampling the reference frame when encoding is preset in the encoding and decoding standard set in the encoding and decoding standard is the same as the method for upsampling the reference frame during decoding.

Figure 12:
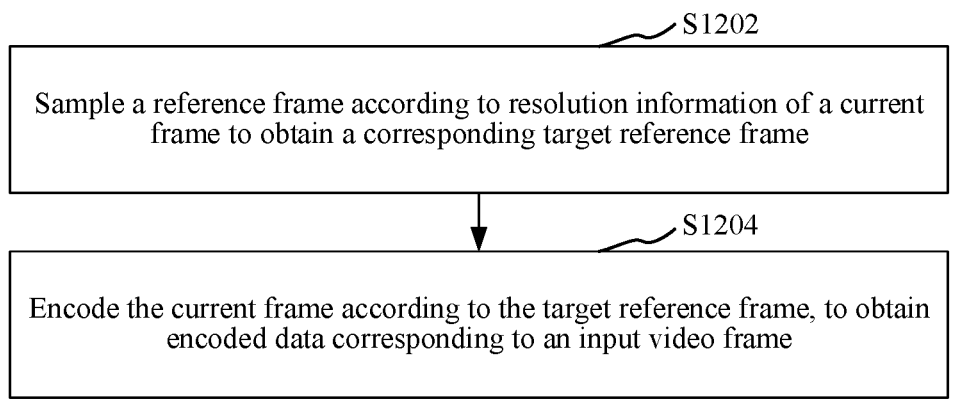
FIG. 12 is a flowchart of performing encoding according to a reference frame to obtain encoded data in an embodiment of this application.

In an embodiment, as shown in FIG. 12, step S910B, that is, encoding the current frame according to the reference frame to obtain the encoded data corresponding to the input video frame, includes the following steps.

Step S1202: Sample the reference frame according to the resolution information of the current frame to obtain a corresponding target reference frame.

The target reference frame is a video frame obtained after the reference frame is sampled. The sampling is a process of sampling the reference frame according to the resolution information of the current frame, to make resolution information of the obtained target reference frame match that of the current frame. During sampling processing, a sampling processing method may be determined first, and the sampling processing method includes one of a direct subpixel interpolation manner and a subpixel interpolation manner after sampling. In the direct subpixel interpolation manner, subpixel interpolation is directly performed on the reference frame, and in the subpixel interpolation manner after sampling, subpixel interpolation is performed on the reference frame after the reference frame is sampled.

Figures 13A, 13B, 14:
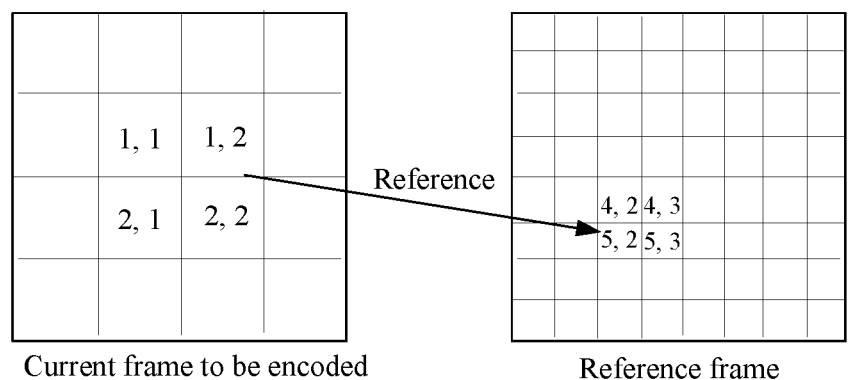
FIG. 13A is a schematic diagram of performing interpolation on a reference frame in an embodiment of this application.
FIG. 13B is a schematic diagram of performing interpolation on a reference frame in an embodiment of this application.
FIG. 14 is a schematic diagram of a reference frame and a current frame in an embodiment of this application.

Subpixel interpolation is a process of obtaining subpixel-level reference data by performing interpolation on reference data of an integer pixel in the reference frame. For example, FIG. 13A and FIG. 13B are schematic diagrams of performing interpolation on a reference frame according to an embodiment. Referring to FIG. 13A, pixels, such as A1, A2, A3, B1, B2, and B3, are 2*2 integer pixels in the reference frame, and reference data of subpixels is calculated according to reference data of the integer pixels. For example, reference data of a subpixel a23 is calculated by averaging reference data of three integer pixels, namely, A1, A2, and A3, reference data of a subpixel a21 is calculated by averaging reference data of three integer pixels, namely, A2, B2, and C2, and then reference data of a subpixel a22 is calculated according to the reference data of the subpixels a23 and a21, to implement interpolation with ½ pixel precision on the reference frame. Referring to FIG. 13B, pixels, such as A1, A2, A3, B1, B2, and B3, are 4*4 integer pixels in the reference frame, and reference data of 15 subpixels is calculated according to the reference data of the integer pixels, to implement interpolation with ¼ pixel precision on the reference frame. For example, reference data of a subpixel a8 is calculated according to reference data of the integer pixels A2 and B2, reference data of a subpixel a2 is calculated according to reference data of the integer pixels A2 and A3, and similarly, reference data of a total of 15 subpixels, that is, a1 to a15, is calculated, to implement interpolation with ¼ pixel precision on the integer pixel A2. In a process of encoding the current frame, a reference block corresponding to a coded block in the current frame needs to be found in the reference frame by using a motion search technology, and a motion vector is calculated according to motion information of the coded block relative to the reference block, and the motion vector is encoded to notify the decoding end of the location of the reference data corresponding to the reference block in the reference frame. Therefore, the target reference frame is obtained by performing subpixel interpolation on the reference frame, so that motion estimation may be performed on the current frame according to a target reference frame with a higher resolution, to improve accuracy of motion estimation, and improve encoding quality.

In an embodiment, the encoding end and the decoding end may set, in respective encoding and decoding rules, sampling processing methods adopted when the target reference frame is obtained by processing the reference frame, and the adopted sampling processing methods are consistent. A sampling processing method corresponding to processing the reference frame is determined according to configuration during encoding and decoding.

In an embodiment, encoding the current frame at a resolution of the current frame, to obtain encoded data corresponding to the input video frame includes: adding sampling processing method information corresponding to sampling performed on the reference frame to the encoded data corresponding to the reference frame. A location for adding the sampling processing method information corresponding to sampling the reference frame to the encoded data may be any one of corresponding sequence-level header information, group-level header information, and frame-level header information. The location for adding the sampling processing method information to the encoded data may be determined according to an action range corresponding to the sampling processing method. The sampling processing method information may be added to the frame-level header information of the encoded data corresponding to the input video frame, indicating that when the input video frame is encoded, subpixel interpolation is performed on the corresponding reference frame in a sampling processing method corresponding to the sampling processing method information. For example, when a flag bit Pixel_Source_Interpolation used for determining the sampling processing method in the frame-level header information of the encoded data is 0, it indicates that the subpixel interpolation is directly performed on the reference frame corresponding to the input video frame; and when Pixel_Source_Interpolation is 1, it indicates that sampling is first performed on the reference frame corresponding to the input video frame, and then subpixel interpolation is performed on the reference frame. The decoding end may perform subpixel interpolation on the reference frame in the subpixel interpolation manner indicated by the flag bit in the encoded data, to obtain the target reference frame, so that the encoded data may be decoded according to the target reference frame to obtain the reconstructed video frame.

In an embodiment, a sampling proportion of the reference frame may be determined according to a proportional relationship between the resolution of the current frame and the resolution of the reference frame. For example, if resolutions of input video frames are all 2M*2N, and the current input video frame is processed in a full-resolution processing method, that is, the current input video frame is directly used as a current frame, the resolution of the current frame is 2M*2N. If the input video frame that can be used as a reference frame is processed in a downsampling processing method, and the resolution of the reference frame obtained after the downsampling is M*2N, a resolution of a corresponding reference frame obtained after reconstruction is also M*2N, and then, it is determined to upsample the reference frame at a sampling proportion of ½ in width and 1 in height, to obtain a frame with a resolution the same as that of the current frame. If the current input video frame is processed in the downsampling processing method, the resolution of the current frame obtained after downsampling is M*N. If the input video frame that can be used as a reference frame is processed in a full-resolution processing method, and the resolution of the reference frame obtained after reconstruction is 2M*2N, it is determined to downsample the reference frame at a sampling proportion of 2/1 in both width and height, to obtain a frame with a resolution the same as that of the current frame.

In an embodiment, because the resolutions of input video frames are generally the same, a downsampling proportion corresponding to the current frame may be obtained by downsampling the input video frame, and a downsampling proportion corresponding to the reference frame to be encoded is obtained by downsampling the input video frame that can be used as a reference frame, to obtain a sampling proportion of the reference frame. For example, if the current frame is obtained by downsampling the input video frame at a sampling proportion of 2/1, and the reference frame to be encoded is obtained by downsampling, at a sampling proportion of 4/1, the input video frame that can be used as a reference frame, a downsampling proportion corresponding to the reference frame obtained after reconstruction is performed according to the encoded data of the reference frame to be encoded is also 4/1. Then, it may be determined, according to a multiple relationship between downsampling proportions of the two, to downsample the reference frame at a sampling proportion of ½, to obtain a frame with a resolution the same as that of the current frame.

In an embodiment, a sampling method for sampling the reference frame matches a sampling algorithm by which the input video frame is downsampled to obtain the current frame. To be specific, if the reference frame needs to be downsampled, the downsampling algorithm is the same as the downsampling algorithm by which the current frame to be encoded is downsampled to obtain the current frame. If the reference frame needs to be upsampled, the upsampling algorithm is an inverse sampling algorithm matching the downsampling algorithm by which the input video frame is downsampled to obtain the current frame.

In this embodiment, the sampling algorithm for sampling the reference frame matches the sampling algorithm by which the current frame to be encoded is downsampled to obtain a current coded video frame, to further improve a degree of image matching between the reference frame and the current coded video frame, thereby further improving accuracy of inter-prediction, reducing a prediction residual, and improving quality of an encoded image.

Step S1204: Encode the current frame according to the target reference frame, to obtain the encoded data corresponding to the input video frame.

After the target reference frame is obtained, an image block similar to a coded block is found in the target reference frame as a reference block, and a pixel difference between the coded block and the reference block is calculated, to obtain a prediction residual. A first motion vector is obtained according to displacement between the coded block and the corresponding target reference block. The encoded data is obtained according to the first motion vector and the prediction residual.

In an embodiment, the first motion vector may be transformed according to target motion vector unit resolution information, to obtain the target motion vector at a target resolution, and the encoded data is generated according to the target motion vector and the prediction residual. The method for transforming the first motion vector according to the target motion vector unit resolution information to obtain the target motion vector is described below.

In an embodiment, alternatively, a vector difference between the target motion vector and a corresponding predicted motion vector may be calculated, and the vector difference is encoded to obtain encoded data, thereby further reducing an amount of encoded data. A step of calculating the vector difference may include: obtaining an initial predicted motion vector corresponding to a current coded block; obtaining a second vector transform coefficient according to current motion vector unit resolution information corresponding to the initial predicted motion vector and target motion vector unit resolution information; obtaining a target predicted motion vector corresponding to the current coded block according to the initial predicted motion vector and the second vector transform coefficient; and obtaining a motion vector difference according to a target motion vector and the target predicted motion vector. The target predicted motion vector is a motion vector at the target resolution, and a method for calculating the vector difference is described below.

In an embodiment, step S1202, that is, sampling the reference frame according to the resolution information of the current frame, to obtain a corresponding target reference frame, includes: sampling the reference frame according to the resolution information of the current frame and motion estimation pixel precision, to obtain the corresponding target reference frame.

The motion estimation pixel precision is a unit length of a motion vector corresponding to a coded block in the current frame. When the coded block in the current frame is encoded, a unit length of a motion vector corresponding to the coded block is refined according to the obtained motion estimation pixel precision, so that the obtained motion vector is more refined and accurate. Therefore, the reference frame needs to be sampled according to the obtained motion estimation pixel precision, to obtain the target reference frame, a first motion vector corresponding to each coded block in the current frame is then calculated according to the target reference frame, and encoding is performed based on the first motion vector, to obtain the encoded data corresponding to the current frame.

Resolution information of the reference frame may be obtained, and a specific sampling processing method performed on the reference frame, a sampling proportion corresponding to the sampling, and pixel interpolation precision are determined according to the sampling processing method used for the current frame, the resolution information of the current frame, the resolution information of the reference frame, and the motion estimation pixel precision corresponding to the current frame. The motion estimation pixel precision may be set according to a requirement, for example, is generally ½ pixel precision, ¼ pixel precision, or ⅛ pixel precision.

In an embodiment, corresponding motion estimation pixel precision may be configured for the current frame according to the image feature information of the current frame, and the image feature information, for example, may be a size, texture information, and a motion speed of the current frame. The motion estimation pixel precision corresponding to the current frame may be determined by integrating a plurality of types of image feature information. More complex image data carried in the current frame indicates richer image information and higher corresponding motion estimation pixel precision. For example, when inter-prediction is performed on a P-frame, a motion vector corresponding to each coded block in the P-frame may be calculated by using relatively high motion estimation pixel precision, and when inter-prediction is performed on a B-frame, a motion vector corresponding to each coded block in the B-frame may be calculated by using relatively low motion estimation pixel precision.

In an embodiment, sampling the reference frame according to the resolution information of the current frame and motion estimation pixel precision, to obtain the corresponding target reference frame includes: calculating pixel interpolation precision according to the resolution information of the current frame and the motion estimation pixel precision; and directly performing subpixel interpolation on the reference frame according to the pixel interpolation precision, to obtain the corresponding target reference frame.

The pixel interpolation precision is pixel precision corresponding to subpixel interpolation performed on the reference frame. When the subpixel interpolation manner is the direct subpixel interpolation manner, it indicates that subpixel interpolation may be directly performed on the reference frame, to obtain the target reference frame. Therefore, the pixel interpolation precision may be calculated according to the resolution information of the current frame and the motion estimation pixel precision. A ratio of the resolution information of the reference frame to the resolution information of the current frame may be calculated, and the pixel interpolation precision is obtained according to the ratio and the motion estimation pixel precision.

In an embodiment, when the resolution of the reference frame is higher than the resolution of the current frame, data of some subpixels in the reference frame may be directly reused, and may be used as data corresponding to subpixels corresponding to the motion estimation pixel precision. For example, the resolution of the current frame is M*N, and the resolution of the reference frame is 2M*2N. If the motion estimation pixel precision is ½, and the pixel interpolation precision is 1, the reference frame may be directly used as the target reference frame. If the motion estimation pixel precision is ¼, the calculated pixel interpolation precision is ½, and the subpixel interpolation may be performed on the reference frame by using pixel interpolation precision of ½, to obtain the target reference frame.

In an embodiment, when the resolution indicated by the resolution information of the current frame is the same as the resolution of the reference frame, subpixel interpolation is directly performed on the reference frame according to the motion estimation pixel precision, to obtain the corresponding target reference frame.

When the current frame is obtained by processing the input video frame in the full-resolution processing method, and the resolution of the reference frame is also the original resolution, the resolution of the current frame is the same as the resolution of the reference frame. Alternatively, when the current frame is obtained by processing the input video frame in the downsampling processing method and the reference frame is also obtained by reconstructing encoded data obtained through encoding in the downsampling processing method at the same sampling proportion, the resolution of the current frame is the same as the resolution of the reference frame. Then, subpixel interpolation may be directly performed on the reference frame based on the motion estimation pixel precision, to obtain the target reference frame, and the pixel interpolation precision corresponding to the subpixel interpolation is the same as the motion estimation pixel precision.

In an embodiment, sampling the reference frame according to the resolution information of the current frame and motion estimation pixel precision to obtain the corresponding target reference frame includes: sampling the reference frame according to the resolution information of the current frame to obtain an intermediate reference frame; and performing subpixel interpolation on the intermediate reference frame according to the motion estimation pixel precision, to obtain the target reference frame.

When the subpixel interpolation manner corresponding to the current frame is the subpixel interpolation manner after sampling, it indicates that the reference frame first needs to be sampled, to obtain an intermediate reference frame with a resolution the same as that of the current frame, and then subpixel interpolation is performed on the intermediate reference frame, to obtain the corresponding target reference frame.

When the resolution indicated by the resolution information of the current frame is lower than the resolution of the reference frame, the reference frame is downsampled according to the resolution information of the current frame, to obtain an intermediate reference frame; and subpixel interpolation is performed on the intermediate reference frame according to the motion estimation pixel precision corresponding to the current frame, to obtain the target reference frame. For example, if an input video frame with a resolution of 2M*2N is downsampled in a downsampling processing method to obtain a current frame with a resolution of M*N, and the resolution of the reference frame is 2M*2N (the full-resolution processing method), the reference frame is downsampled at a sampling proportion of 2/1, to obtain an intermediate reference frame with a resolution of M*N. If the motion estimation pixel precision corresponding to the obtained current frame is ½, subpixel interpolation is then performed on the intermediate reference frame according to pixel interpolation precision the same as the motion estimation pixel precision, that is, the ½ subpixel interpolation precision, to obtain the target reference frame. If the motion estimation pixel precision corresponding to the obtained current frame is ¼, subpixel interpolation is performed on the intermediate reference frame according to the ¼ subpixel interpolation precision, to obtain the target reference frame.

When the resolution information indicated by the resolution information of the current frame is higher than the resolution of the reference frame, the reference frame is upsampled according to the resolution information of the current frame, to obtain the intermediate reference frame; and subpixel interpolation is performed on the intermediate reference frame according to the motion estimation pixel precision corresponding to the current frame, to obtain the target reference frame. For example, if the resolution of the current frame is 2M*2N, and the resolution of the reference frame is ½M*½N, the reference frame needs to be upsampled at a sampling proportion of ¼, to obtain an intermediate reference frame with a resolution the same as that of the current frame. If the motion estimation pixel precision is ½, subpixel interpolation continues to be performed on the obtained intermediate reference frame according to pixel interpolation precision of ½, to obtain the target reference frame. If the motion estimation pixel precision is ¼, subpixel interpolation continues to be performed on the obtained intermediate reference frame according to pixel interpolation precision of ¼, to obtain the target reference frame.

Step S910B, that is, encoding the current frame at a resolution of the current frame according to a reference frame to obtain encoded data corresponding to the input video frame, includes: determining a first vector transform parameter according to the resolution information of the current frame and first resolution information, the first resolution information including resolution information of the reference frame or target motion vector unit resolution information corresponding to the input video frame; and obtain a target motion vector corresponding to each coded block in the current frame according to the first vector transform parameter.

The first vector transform parameter is used for transforming obtained location information of a motion vector or the motion vector. The resolution information is information related to a resolution, for example, may be the resolution or a downsampling proportion. The first vector transform parameter may be a ratio of the resolution information of the current frame to the first resolution information. For example, assuming that the downsampling proportion of the reference frame is 3/1, and the downsampling proportion of the current frame is 6/1, the first vector transform parameter may be obtained by dividing 6 by 3, that is, 2.

In an embodiment, after the first vector transform parameter is obtained, the obtained motion vector or the location information corresponding to the motion vector is transformed according to the first vector transform parameter, to obtain the target motion vector. When the target motion vector is transformed by using the first vector transform parameter, the target motion vector is a motion vector in a target resolution indicated by the target motion vector unit resolution information. The target motion vector unit resolution information is information corresponding to a target resolution corresponding to a unit of the target motion vector, and for example, may be the target resolution or a downsampling proportion. When the location information corresponding to the motion vector is transformed by using the first vector transform parameter, the location information corresponding to the current frame and the location information of the reference frame are in a same quantization scale, a second motion vector is obtained according to transformed location information, and the second motion vector is transformed into the target motion vector at the target resolution.

In an embodiment, determining a first vector transform parameter according to the resolution information of the current frame and first resolution information includes: determining the first vector transform parameter according to the resolution information of the current frame and the resolution information of the reference frame. Obtaining a target motion vector corresponding to each coded block in the current frame according to the first vector transform parameter includes: obtaining first location information corresponding to a current coded block, and obtaining second location information corresponding to a target reference block corresponding to the current coded block; and calculating a target motion vector corresponding to the current coded block according to the first vector transform parameter, the first location information, and the second location information.

The current coded block is a coded block on which predictive encoding currently needs to be performed in the input video frame. The target reference block is an image block used for performing predictive encoding on the current coded block in the reference frame. The first location information corresponding to the current coded block may be represented by coordinates of a pixel. The first location information corresponding to the current coded block may include coordinates corresponding to all pixels of the current coded block, and the first location information corresponding to the current coded block may alternatively include coordinates of one or more pixels of the current coded block. The second location information corresponding to the target reference block may include coordinates corresponding to all pixels of the target reference block, and the second location information corresponding to the target reference block may alternatively include coordinates of one or more pixels of the target reference block. For example, coordinates of the first pixel of the current image block may be used as coordinates of the current coded block, and coordinates of the first pixel of the target reference block may be used as coordinates of the target reference block.

In an embodiment, the first location information may be transformed by using the first vector transform parameter, to obtain corresponding first transformed location information, and the target motion vector is obtained according to a difference between the first transformed location information and the second location information. Alternatively, the second location information may be transformed by using the first vector transform parameter, to obtain corresponding second transformed location information, and the target motion vector is obtained according to a difference between the first location information and the second transformed location information.

In an embodiment, the first vector transform parameter is a proportion obtained by dividing large resolution information by small resolution information in the resolution information of the current frame and the resolution information of the reference frame, where the resolution corresponding to the large resolution information is higher than the resolution corresponding to the small resolution information. The first vector transform parameter is used for transforming location information of a frame with the small resolution information in the current frame and the reference frame. For example, if the resolution of the current frame is 1200*1200 pixels and the resolution of the reference frame is 600*600 pixels, the large resolution is 1200*1200 pixels, and the small resolution is 600*600 pixels. The first vector transform parameter may be 2. Assuming that the first location information is (6, 8), and the second location information is (3, 3), the target motion vector is (6, 8)−(3*2, 3*2)=(0, 2). In this embodiment of this application, the location information corresponding to the frame of the small resolution information is transformed, to reduce a value of the target motion vector, and reduce an amount of the encoded data.

In an embodiment, the first vector transform parameter is a proportion obtained by dividing small resolution information by large resolution information in the resolution information of the current frame and the resolution information of the reference frame, where the first vector transform parameter is used for transforming the location information of the frame of the large resolution information in the current frame and the reference frame. For example, assuming that the resolution of the current frame is 1200*1200 pixels, and the resolution of the reference frame is 600*600 pixels, the first vector transform parameter may be ½. Assuming that the first location information is (6, 8), and the second location information is (3, 3), the target motion vector is (6*½, 8*½)−(3, 3)=(0, 1).

In this embodiment of this application, the location information is transformed by using the first vector transform parameter, so that obtained location information is in a same quantization scale, to reduce a value of the target motion vector, and reduce an amount of the encoded data. For example, as shown in FIG. 14, the resolution of the reference frame is two times that of the current frame, the current coded block is formed by pixels (1, 1), (1, 2), (2, 1), and (2, 2), and the corresponding target reference block is formed by pixels (4, 2), (4, 3), (5, 2), and (5, 3). If transform is not performed, the target motion vector is (−3, −1). If corresponding location information in the current frame is multiplied by 2 during calculation of the target motion vector, and then the target motion vector is calculated, the target motion vector is (−2, 0), less than (−3, −1).

In an embodiment, determining a first vector transform parameter according to the resolution information of the current frame and first resolution information includes: obtaining the target motion vector unit resolution information; and determining the first vector transform parameter according to the resolution information of the current frame and the target motion vector unit resolution information. Obtaining a target motion vector corresponding to each coded block in the current frame according to the first vector transform parameter includes: obtaining a first motion vector according to displacement between the current coded block and the corresponding target reference block; and obtaining the target motion vector corresponding to the current coded block according to the first vector transform parameter and the first motion vector.

The target motion vector unit resolution information is information corresponding to a target resolution corresponding to a unit of the target motion vector, and for example, may be the target resolution or a corresponding downsampling proportion. The target motion vector is calculated by using a vector unit at the resolution as a standard. Some of current frames corresponding to the inputted video sequence may have resolutions the same as the original resolution of the input video frame, and resolutions of some other current frames are less than the original resolution of the input video frame, that is, current frames in the video sequence have various resolutions. Therefore, a resolution corresponding to a unit of the target motion vector needs to be determined. The resolution corresponding to the unit of the target motion vector may be set before encoding or obtained according to a parameter of an encoding process, and may be specifically set according to a requirement.

The first motion vector is obtained according to displacement between the current coded block and the corresponding target reference block, and the target reference block may be obtained from the reference frame, or from the target reference frame obtained by processing the reference frame. After the first motion vector is obtained, the first vector transform parameter may be multiplied by the first motion vector, and the obtained product is used as the target motion vector. For example, it is assumed that the resolution corresponding to the target motion vector unit is the original resolution, and the downsampling proportion corresponding to the current frame is 2/1. The target motion vector unit is the original resolution, and the first motion vector is calculated at the resolution of the current frame. Therefore, the first motion vector needs to be transformed. The first vector transform parameter is equal to 2, and when the obtained first motion vector is (2, 2), the target motion vector is (4, 4). After obtaining the target motion vector, encoding may be performed according to the target motion vector, for example, the target motion vector and the prediction residual corresponding to the current coded block may be encoded, to obtain the encoded data.

In an embodiment, when the target reference block is obtained from the reference frame, it may be understood that for the same coded block, the first motion vector may be equal to the second motion vector.

In an embodiment, the resolution corresponding to the unit of the target motion vector may be the resolution corresponding to the input video frame, that is, the original resolution, or the resolution corresponding to the unit of the target motion vector is the resolution corresponding to the current frame. The first vector transform parameter may be a ratio of the resolution information corresponding to the target motion vector unit to the resolution information of the current frame. For example, assuming the resolution corresponding to the target motion vector unit is the original resolution, the sampling proportion corresponding to the target motion vector unit is 1, and the sampling proportion of the resolution of the current frame is 2/1, the first vector transform parameter may be obtained by dividing 2 by 1, that is, 2. Alternatively, assuming that the resolution corresponding to the target motion vector unit is the original resolution, that is, 900*900 pixels, the resolution of the current frame is 450*600 pixels, and there may be two first vector transform parameters, that is, a first vector transform parameter in a horizontal direction and a first vector transform parameter in a vertical direction, the first vector transform parameter in the horizontal direction is 900/450=2, and the first vector transform parameter in the vertical direction is 900/600=1.5.

In an embodiment, the target motion vector unit resolution information may be obtained according to a computing capability of a device performing encoding. For example, when the device performing encoding can perform computing only on integers or spends long time in computing when a value is a decimal, the resolution corresponding to the target motion vector unit may be the original resolution corresponding to the input video frame. When the device performing encoding can quickly compute decimals, the resolution corresponding to the target motion vector unit may be the resolution corresponding to the current frame.

In an embodiment, when the resolution information of the current frame is consistent with the target motion vector unit resolution information, the first vector transform parameter is 1, and the first motion vector is the same as the target motion vector. Therefore, step 9802 may be skipped, and the first motion vector is used as the target motion vector. When the resolution information of the current frame is inconsistent with the target motion vector unit resolution information, step S902 is performed.

In this embodiment of this application, when the resolution corresponding to the unit of the target motion vector is the resolution corresponding to the input video frame, that is, the original resolution, for a video sequence with a consistent resolution, target resolutions corresponding to the input video frames are consistent, so that consistency of the target motion vector can be kept. When the resolution corresponding to the unit of the target motion vector is the resolution corresponding to the current frame to be encoded, because the resolution information of the current frame is consistent with the target motion vector unit resolution information, the first motion vector does not need to be transformed, so that computing time can be reduced.

In an embodiment, identification information indicating the target motion vector unit resolution information may be added to the encoded data, so that the decoding end may obtain the target resolution corresponding to the target motion vector. If the identification information is not carried, the encoding end and the decoding end may agree on the target resolution corresponding to the target motion vector. The identification information is used for indicating the resolution information corresponding to the target motion vector. A location for adding the identification information to the encoded data may be one or more of group-level header information, sequence-level header information, frame-level header information, and block-level header information. The block-level header information is header information of encoded data corresponding to the coded block. The location for adding the identification information in the encoded data may be determined according to an action range of the target motion vector unit resolution information. For example, if resolutions corresponding to the vector units in the video sequence are consistent, the location for adding may be the sequence-level header information. Resolution information represented by a value of a flag bit may be set according to a requirement. For example, when the resolution corresponding to the target motion vector unit resolution information is the original resolution, the corresponding flag bit MV_Scale_Adaptive is 0. When the resolution corresponding to the target motion vector unit resolution information is the resolution corresponding to the current frame, the corresponding flag bit MV_Scale_Adaptive is 1.

Figure 15:
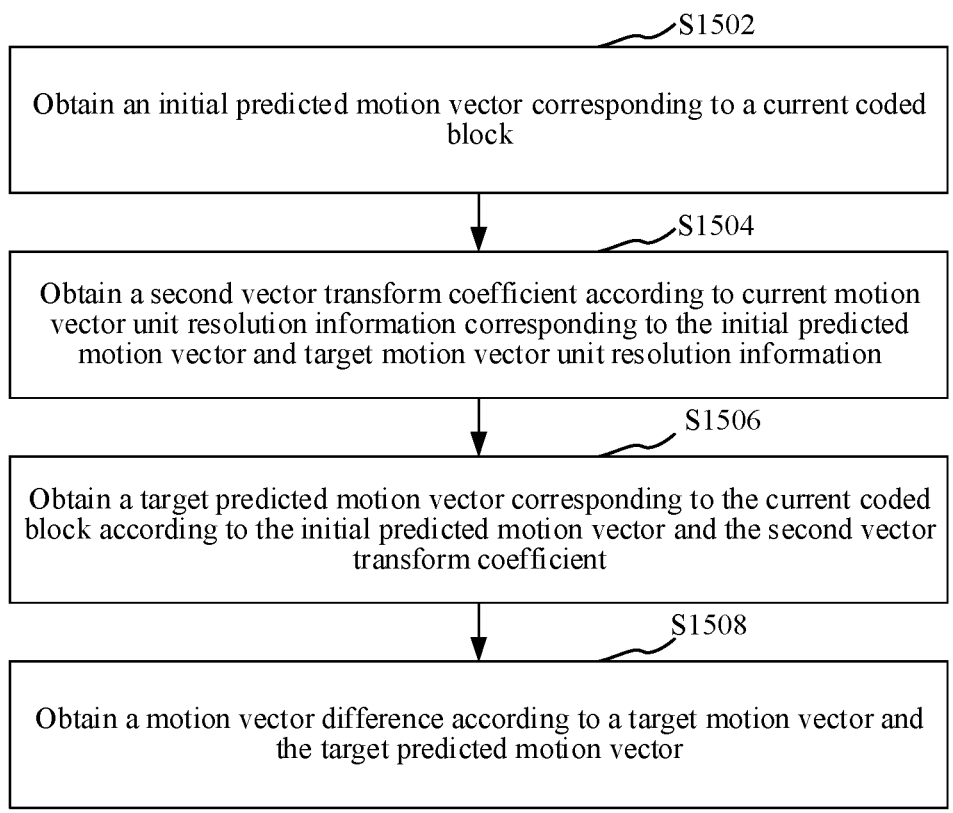
FIG. 15 is a flowchart of encoding a current frame to obtain encoded data in another embodiment of this application.

In an embodiment, as shown in FIG. 15, step S910, that is, encoding the current frame according to the reference frame to obtain the encoded data corresponding to the input video frame, includes the following steps.

Step S1502: Obtain an initial predicted motion vector corresponding to a current coded block.

To reduce a quantity of bits used for encoding data, a motion vector of the current coded block may be predicted, to obtain a predicted value, a difference between the target motion vector and the predicted value is calculated, to obtain a motion vector difference, and the motion vector difference is encoded. The initial predicted motion vector is used for predicting the motion vector of the current coded block. There may be one or more initial predicted motion vectors, and details may be set according to a requirement. A rule for obtaining the initial predicted motion vector may be set according to a requirement. Because the current coded block usually has a spatial correlation with a coded block adjacent thereto, a target motion vector value corresponding to one or more adjacent encoded blocks corresponding to the current coded block may be used as the initial predicted motion vector. For example, the first motion vector value corresponding to adjacent encoded blocks in the upper right corner and the upper left corner of the current coded block may be used as the initial predicted motion vector. Alternatively, a motion vector value of the target reference block corresponding to the target reference block corresponding to the current coded block may be used as the initial predicted motion vector.

Step S1504: Obtain a second vector transform coefficient according to current motion vector unit resolution information corresponding to the initial predicted motion vector and the target motion vector unit resolution information.

The current motion vector unit resolution information is information corresponding to the current resolution corresponding to a unit of the initial predicted motion vector, and for example, may be a current resolution or a downsampling proportion. The resolution corresponding to the unit of the initial predicted motion vector means that the unit of the initial predicted motion vector is calculated by using a vector unit in the current resolution as a standard, that is, the motion vector at the current resolution. When the current motion vector unit resolution information corresponding to the initial predicted motion vector is different from the target motion vector unit resolution information, a second vector transform coefficient needs to be obtained according to the current motion vector unit resolution information corresponding to the initial predicted motion vector and the target motion vector unit resolution information. The second vector transform parameter is used for transforming the initial predicted motion vector into a motion vector at the target resolution, and may be a ratio of the resolution information corresponding to the target motion vector unit to the current motion vector unit resolution information. For example, assuming that the resolution corresponding to the target motion vector unit is 200*200 pixels, and the current motion vector unit resolution information is 100*100 pixels, the second vector transform parameter may be 2.

Step S1506: Obtain a target predicted motion vector corresponding to the current coded block according to the initial predicted motion vector and the second vector transform coefficient.

After the second vector transform parameter is obtained, the target predicted motion vector is obtained by performing computing according to the initial predicted motion vector and the second vector transform coefficient, where the target predicted motion vector is a predicted motion vector at the target resolution. For example, when there is one initial predicted motion vector, a product between the initial predicted motion vector and the second vector transform coefficient may be used as the target predicted motion vector. When there are a plurality of initial predicted motion vectors, the initial predicted motion vectors are computed, to obtain a computing result, and the target motion vector is obtained according to the computing result and the second vector transform coefficient. The computing result may be one or more of a minimum value, an average value, and an intermediate value in the initial predicted motion vectors. It may be understood that, an algorithm for obtaining the target predicted motion vector according to the initial predicted motion vector and the second vector transform coefficient may be customized, and the same target predicted motion vector may be calculated by using a consistent customized algorithm on the decoding end.

Step S1508: Obtain a motion vector difference according to the target motion vector and the target predicted motion vector.

The difference between the target motion vector and the target predicted motion vector is used as the motion vector difference, to perform encoding according to the motion vector difference, to obtain the encoded data, and reduce a data amount of the encoded data.

In this embodiment of this application, the initial predicted motion vector is transformed, to obtain the target predicted motion vector at the target resolution, so that units of the target predicted motion vector and the target motion vector are in a matching quantization scale. Therefore, the obtained motion vector difference is small, and the data amount of the encoded data is reduced.

In an embodiment, step S904, that is, determining a processing method corresponding to the input video frame includes: calculating a proportion of a target prediction-type coded block in a forward-encoded video frame corresponding to the input video frame; and determining the processing method corresponding to the input video frame according to the proportion.

The prediction-type coded block is a coded block corresponding to a frame prediction-type. The proportion of the target prediction-type coded block may be one or two of a proportion corresponding to an intra-coded block and a proportion corresponding to an inter-coded block. The proportion of the target prediction-type coded block in the forward-encoded video frame corresponding to the input video frame may be a ratio of the target prediction-type coded block to another prediction-type coded block, or a ratio of a quantity of coded blocks of this type to a total quantity of coded blocks. Details may be set according to a requirement. For example, a first quantity of intra-coded blocks in the forward-encoded video frame and a second quantity of inter-coded blocks in the forward-encoded video frame may be obtained. A ratio of the intra-coded block to the inter-coded block is calculated according to the first quantity and the second quantity, or a third quantity of all coded blocks in the forward-encoded video frame is counted, to obtain a ratio of the intra-coded block to the third quantity according to the first quantity and the third quantity. A ratio of the inter-coded block to the third quantity may alternatively be calculated according to the second quantity and the third quantity.

The forward-encoded video frame is a video frame that has been encoded before the input video frame is encoded, and a specific quantity of the obtained forward-encoded video frames may be customized. For example, the forward-encoded video frame may be one encoded video frame that has been encoded previous to the input video frame, or three encoded video frames that have been encoded previous to the input video frame. After the corresponding proportion of the target prediction-type coded block in the forward-encoded video frame is calculated, the target processing method corresponding to the input video frame is determined according to the calculated proportion. When there are a plurality of obtained forward-encoded video frames, corresponding proportions of coded blocks of different types in each forward-encoded video frame may be calculated, and a total proportion is obtained through weighted calculation according to the proportions, and the target processing method corresponding to the input video frame is then determined according to the total proportion and a preset threshold. The weight corresponding to the forward-encoded video frame may be in a negative association with an encoding distance between the forward-encoded video frame and the input video frame.

In an embodiment, a proportion of the intra-coded block of the forward-encoded video frame in the forward-encoded video frame may be calculated, and when the proportion is greater than a target threshold, the processing method is determined as the downsampling processing method.

For the proportion corresponding to the intra-coded block, when the proportion is greater than the target threshold, the target processing method corresponding to the input video frame may be determined as the downsampling processing method, and otherwise, the target processing method corresponding to the video frame is determined as the full-resolution processing method. For example, when the proportion is greater than the target threshold, the processing method corresponding to the input video frame is determined as the downsampling processing method, and otherwise, the target processing method corresponding to the video frame is determined as the full-resolution processing method.

In this embodiment, a larger proportion of the intra-coded block indicates higher complexity of the video or lower correlation between video frames. Therefore, the obtained prediction residual is relatively large, and therefore, the downsampling processing method is more inclined to be used for encoding, to reduce the amount of the encoded data.

The target threshold may be determined according to a processing method of the reference frame corresponding to the input video frame. When the processing method of the reference frame corresponding to the input video frame is the downsampling processing method, a first preset threshold T1 is obtained, and the first preset threshold T1 is used as a target threshold. Similarly, when the processing method of the reference frame corresponding to the input video frame is the full-resolution processing method, a second preset threshold T2 is obtained, and the second preset threshold T2 is used as a target threshold. Further, after the target threshold is obtained according to the resolution information of the reference frame corresponding to the input video frame, the processing method of the input video frame is determined according to the target threshold and the proportion of the intra-coded block of the forward-encoded video frame in the forward-encoded video frame. When the proportion of the intra-coded block of the forward-encoded video frame in the forward-encoded video frame is greater than the target threshold, the processing method corresponding to the input video frame is determined as the downsampling processing method.

In an embodiment, the second preset threshold is greater than the first preset threshold, so that when the processing method corresponding to the reference frame is the full-resolution processing method, the full-resolution processing method is more inclined to be used for the input video frame, and when the target processing method corresponding to the reference frame is the downsampling processing method, the downsampling processing method is more inclined to be used for the input video frame.

Figure 16:
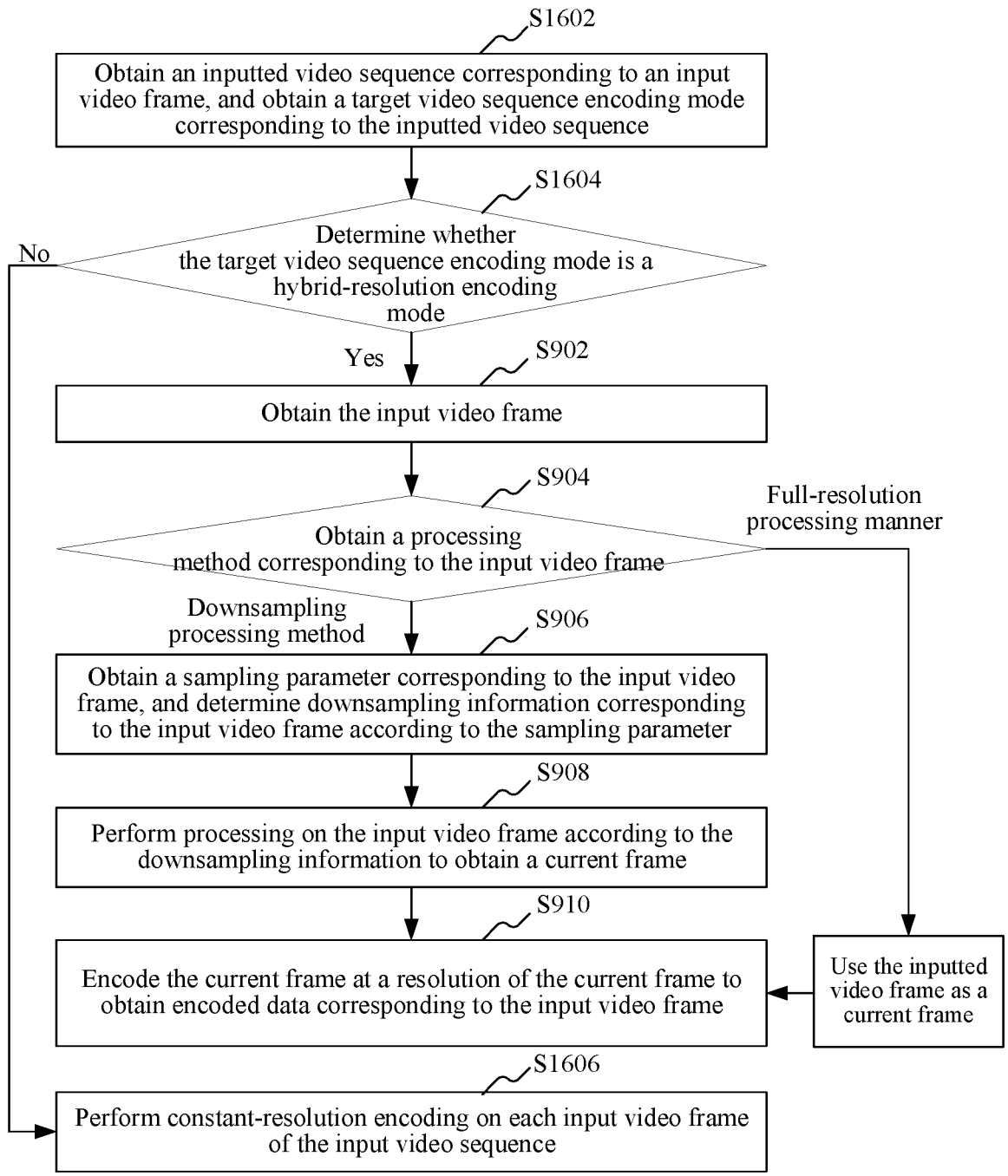
FIG. 16 is a flowchart of a video encoding method in still another embodiment of this application.

In an embodiment, as shown in FIG. 16, before the input video frame is obtained, the video encoding method further includes the following steps.

Step S1602: Obtain an inputted video sequence corresponding to the input video frame, and obtain a target video sequence encoding mode corresponding to the inputted video sequence, the target video sequence encoding mode including a constant-resolution encoding mode or a hybrid-resolution encoding mode.

The inputted video sequence may include a plurality of input video frames. When the target video sequence encoding mode is the constant-resolution encoding mode, each input video frame of the inputted video sequence is encoded at the same resolution, such as a full resolution. When the target video sequence encoding mode is the hybrid-resolution encoding mode, the processing method corresponding to each input video frame is obtained, and the input video frame is processed according to the processing method, to obtain a current frame. When the current frame is encoded, a resolution of the current frame may be the same as the resolution of the input video frame, or lower than the resolution of the input video frame. Therefore, in the inputted video sequence, the current frames have different resolutions. When the video sequence encoding mode is the hybrid-resolution encoding mode, the video encoding method provided in the foregoing embodiments is performed.

In an embodiment, the obtaining a video sequence encoding mode corresponding to the video sequence to be encoded includes: obtaining current environment information, the current environment information including at least one of current encoding environment information and current decoding environment information; and determining the target video sequence encoding mode corresponding to the inputted video sequence according to the current environment information.

The environment information may include one or more of a processing capability of a device performing the video encoding method, a processing capability of a device performing a video decoding method, and current application scenario information. The processing capability may be represented by a processing speed. For example, for a device having a strong processing capability, because the processing speed is high, the corresponding target video sequence encoding mode is the full-resolution encoding mode. When the current application scenario corresponding to the current application scenario information is a real-time application scenario, the video sequence encoding mode is the hybrid-resolution encoding mode. When the current application scenario corresponding to the current application scenario information is a non-real-time application scenario, the video sequence encoding mode is the constant-resolution encoding mode. A correspondence between the current environment information and the video sequence encoding mode may be set. When the current environment information is obtained, the target video sequence encoding mode corresponding to the inputted video sequence is obtained according to the correspondence between the current environment information and the video sequence encoding mode. For example, a correspondence between an average value of a processing speed of the device performing the video encoding method and a processing speed of the device performing the video decoding method and the video sequence encoding mode may be set. After the processing speed of the device performing the video encoding method and the processing speed of the device performing the video decoding method are obtained, the average value is calculated, and the target video sequence encoding mode is obtained according to the average value. Whether the current application scenario is a real-time application scenario may be set according to a requirement. For example, a video call application scenario and a game application scenario are real-time application scenarios, and application scenarios corresponding to video encoding on a video website and encoding of an offline video may be non-real-time application scenarios.

Step S1604: Determine whether the target video sequence encoding mode is the hybrid-resolution encoding mode.

If yes, step S902 is performed, and otherwise, step S1606 is performed.

Step S1606: Perform constant-resolution encoding on each input video frame of the inputted video sequence.

When the video sequence encoding mode is the constant-resolution encoding mode, constant-resolution encoding is performed on each input video frame of the inputted video sequence.

In an embodiment, encoding the current frame at a resolution of the current frame to obtain encoded data corresponding to the input video frame includes: adding target video sequence encoding mode information corresponding to the target video sequence encoding mode to the encoded data.

The target video sequence encoding mode information is used for describing an encoding mode used for the inputted video sequence, and a flag bit Sequence_Mix_Resolution_Flag describing the video sequence encoding mode may be added to the encoded data, and a value of the flag bit may be set according to a requirement. A location for adding the video sequence encoding mode information to the encoded data may be the sequence-level header information. For example, when Sequence_Mix_Resolution_Flag is 1, the corresponding target video sequence encoding mode may be the hybrid-resolution encoding mode. When Sequence_Mix_Resolution_Flag is 0, the corresponding target video sequence encoding mode may be the constant-resolution encoding mode.

Figure 17:
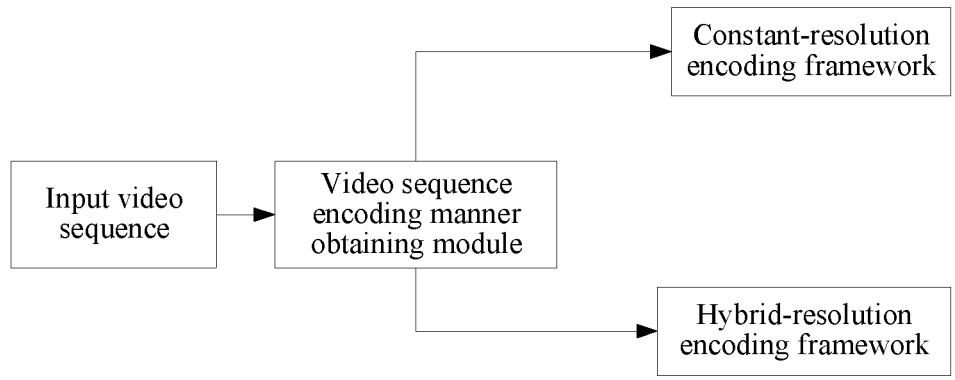
FIG. 17 is a schematic diagram of a video encoding framework in an embodiment of this application.

In an embodiment, a video encoding framework is shown in FIG. 17. The video encoding framework includes a constant-resolution encoding framework and a hybrid-resolution encoding framework, and the hybrid-resolution encoding framework may correspond to the encoding framework in FIG. 2. After the inputted video sequence is obtained, the video sequence encoding mode is decided at a video sequence encoding mode obtaining module. When the target video sequence encoding mode is the hybrid-resolution encoding mode, encoding is performed by using the hybrid-resolution encoding framework. When the target video sequence encoding mode is the constant-resolution encoding mode, constant-resolution encoding is performed by using the constant-resolution encoding framework in FIG. 17. The constant-resolution encoding framework may be a current HEVC encoding framework, an H.265 encoding framework, or the like.

The video encoding method is described below by using an assumption that a video sequence A includes three input video frames: a, b, and c.

1. A target video sequence encoding mode corresponding to the video sequence A is obtained. Because a current environment is a video call environment, the target video sequence encoding mode is a hybrid-resolution encoding mode.

2. The first input video frame a is decided by using a processing decision unit in the hybrid-resolution encoding framework, to obtain that the target processing method is the downsampling manner, and the downsampling proportion is 2/1. Downsampling is performed on a, to obtain a video frame a1 obtained after the downsampling, and intra-frame encoding is performed on a1, to obtain encoded data d1 corresponding to a1, and the encoded data corresponding to a1 is reconstructed, to obtain a corresponding reconstructed video frame a2.

3. The second input video frame b is decided by using the processing decision unit in the hybrid-resolution encoding framework, to obtain that the processing method is the downsampling processing method, and the sampling proportion is 4/1. b is downsampled to obtain b1, and b1 is encoded to obtain encoded data corresponding to b, and sampling proportion information corresponding to the downsampling proportion and processing method information corresponding to the processing method are carried in the encoded data.

The encoding process includes: because b is an inter-predicted frame, a2 needs to be used as a reference frame; and because the resolution of b1 is different from that of a2, a2 needs to be sampled. The sampling manner of a2 is determined as direct subpixel interpolation, and the motion estimation precision is ¼, and therefore the pixel interpolation precision is ¼*2=½. ½ subpixel interpolation is performed on a2 according to the pixel interpolation precision, to obtain a target reference frame a3. A first motion vector MV1 is calculated according to displacement between the current coded block in b1 and the target reference block in the target reference frame, and a prediction residual is p1. It is obtained that the target resolution is the original resolution, and therefore, the target motion vector is 4 MV1. It is obtained through calculation that an initial predicted vector is MV2, and the initial predicted vector is calculated at a resolution corresponding to the downsampling proportion of 4/1. Therefore, the target predicted vector is 4 MV2, and therefore, a motion vector difference MVD1 corresponding to the current coded block is 4 MV1-4 MV2. Transform, quantization, and entropy encoding are performed on MVD1 and p1, to obtain the encoded data.

4. The third input video frame c is decided by using the processing decision unit in the hybrid-resolution encoding framework, to obtain that the processing method is the downsampling processing method, and the sampling proportion is 8/1. c is downsampled, to obtain c1, and c1 is encoded, to obtain encoded data d2 corresponding to c.

The encoding process includes: because c is an inter-predicted frame, the corresponding reference frame is a reconstructed video frame b2 obtained by reconstructing the encoded data of b; and because the resolution of c1 is different from that of b2, b2 needs to be sampled. The sampling manner of b2 is determined as direct subpixel interpolation, and the motion estimation precision is ¼, and therefore the pixel interpolation precision is ¼*2=½. ½ subpixel interpolation is performed on b2 according to the pixel interpolation precision, to obtain a target reference frame b3. A first motion vector MV3 is calculated according to displacement between the current coded block in c1 and the target reference block in the target reference frame, and a prediction residual is p2. It is obtained that the target resolution is the original resolution, and therefore, the target motion vector is 8 MV3. It is obtained that an initial predicted vector is MV4, and the initial predicted vector is calculated at a resolution corresponding to the downsampling proportion of 4/1. Therefore, the target predicted vector is 4 MV4, and therefore, a motion vector difference MVD2 corresponding to the current coded block is 8 MV3-4 MV4. Transform, quantization, and entropy encoding are performed on MVD2 and p2, to obtain encoded data d3.

5. d1, d2, and d3 are formed into an encoded data packet, which is sent to a receiving terminal as encoded data corresponding to the video sequence. The encoded data corresponding to the video sequence carries a flag bit describing the target video sequence encoding mode being the hybrid-resolution encoding mode.

Figure 18:
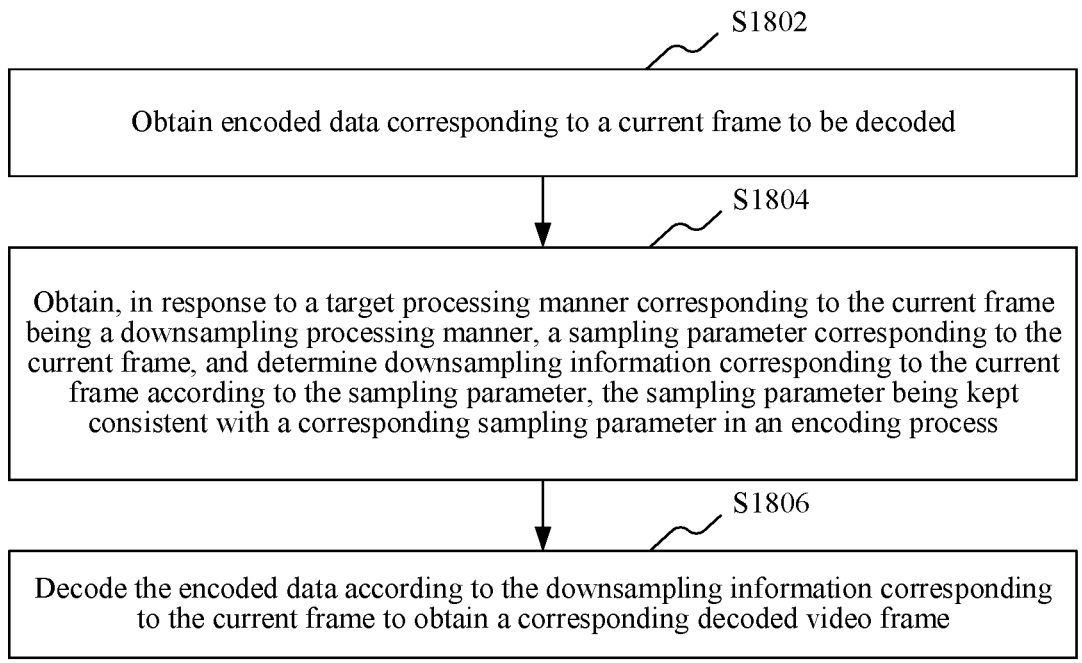
FIG. 18 is a flowchart of a video decoding method in an embodiment of this application.

As shown in FIG. 18, in an embodiment, a video decoding method is provided. The video decoding method not only can be applied to a server, but also can be applied to a terminal. In this embodiment, an example in which the video decoding method is applied to a terminal is used for description. The method includes the following steps.

Step S1802: Obtain encoded data corresponding to a current frame.

For example, the current frame is a video frame that needs to be decoded. The encoded data is data obtained after encoding. A decoding end obtains the encoded data corresponding to the current frame, and decodes the encoded data to obtain a decoded video frame. One video sequence to be decoded may include a plurality of current frames. The current frame may be a video frame obtained in real time, or a video frame obtained in a pre-stored video sequence to be decoded.

Step S1804: Obtain, in a case that a target processing method corresponding to the current frame is determined as a downsampling processing method, a sampling parameter corresponding to the current frame, and determine downsampling information corresponding to the current frame according to the sampling parameter, the sampling parameter being kept consistent with a corresponding sampling parameter in an encoding process.

The sampling parameter is a parameter used for determining the downsampling information. The sampling parameter is kept consistent with the corresponding sampling parameter in the encoding process. That is, the sampling parameter obtained on the decoding end is the same as that on the encoding end, so that downsampling information consistent with that on the encoding end can be determined. A specific used sampling parameter may be customized according to requirements provided that it is ensured that the encoding end and the decoding end can obtain the same sampling parameter. For example, the sampling parameter may include a frame type of a preceding video frame or an input video frame, or include a sampling parameter, such as encoded information of a preceding video frame, that is reproducible on the decoding end. Pieces of information of the sampling parameter that is reproducible in the decoding process are all pieces of information that exist in a bitstream or information that can be derived from information encoded in a bitstream, but if some pieces of information are all non-optimal choices in many attempts and search processes performed on the encoding end, the information is not reproduced on the decoding end. Such information is considered to be irreproducible in the decoding process.

The target processing method is one selected from candidate processing methods. The candidate processing methods may include, but are not limited to, a full-resolution processing method or a downsampling processing method. The target processing method may be a processing method directly read from the encoded data or a processing method obtained according to a processing parameter obtained by the decoding end.

S1806: Decode the encoded data according to the downsampling information corresponding to the video to be decoded to obtain a corresponding decoded video frame.

After the downsampling information is obtained, the encoded data is decoded according to the downsampling information corresponding to the video to be decoded to obtain a corresponding decoded video frame. If the downsampling information includes a downsampling proportion, the encoded data is decoded by using an upsampling proportion corresponding to the downsampling proportion to obtain the corresponding decoded video frame. If the downsampling information includes a downsampling method, the encoded data is decoded by using an upsampling method corresponding to the downsampling method to obtain the corresponding decoded video frame. The same sampling method or different sampling methods may be used as the upsampling method and the downsampling method. For example, a bilinear-interpolation sampling method may be used as both the upsampling method and the downsampling method, or the bilinear-interpolation sampling method is used as one of the upsampling method and the downsampling method, and a CNN sampling method is used as the other.

In the foregoing video decoding method, encoded data corresponding to a current frame is obtained, and downsampling information corresponding to the current frame is determined according to a sampling parameter corresponding to the current frame in a case that a target processing method corresponding to the current frame is determined as a downsampling processing method, the sampling parameter being kept consistent with a corresponding sampling parameter in an encoding process. Downsampling information corresponding to the current frame is obtained from the encoded data, and decoding is performed the according to downsampling information, thereby providing decoding support for encoded data obtained by performing encoding by adaptively selecting the downsampling information.

In an embodiment, the foregoing sampling parameter is a parameter that is reproducible in a decoding process. For example, the sampling parameter includes: the encoded data received by a decoding end and/or processed data obtained according to the encoded data received by the decoding end.

The sampling parameter corresponding to the decoded video frame may be, but is not limited to, at least one of the following: first encoded data corresponding to the decoded video frame, second encoded data corresponding to a preceding video frame prior to the decoded video frame, processed data obtained according to the first encoded data and/or the second encoded data, and an image feature corresponding to a reconstructed video frame prior to the decoded video frame. The image feature is information related to image content, and includes one or more of image motion information and image texture information such as an edge. Specifically, when the sampling parameter corresponding to the decoded video frame is the first encoded data corresponding to the decoded video frame, the sampling parameter corresponding to the decoded video frame is determined as a parameter reproduced in the decoding process; when the sampling parameter corresponding to the decoded video frame is the second encoded data corresponding to the preceding video frame prior to the decoded video frame, the sampling parameter corresponding to the decoded video frame is determined as a parameter reproduced in the decoding process; when the sampling parameter corresponding to the decoded video frame is the processed data obtained according to the first encoded data and/or the second encoded data, the sampling parameter corresponding to the decoded video frame is determined as a parameter reproduced in the decoding process; and in a case of the image feature corresponding to the reconstructed video frame prior to the decoded video frame, the sampling parameter corresponding to the decoded video frame is determined as a parameter reproduced in the decoding process.

In an embodiment, the downsampling information includes a downsampling proportion. The sampling parameter includes at least one of: a frame type of the current frame and encoding information of a preceding video frame corresponding to the current frame. Determining downsampling information corresponding to the current frame according to the sampling parameter includes: calculating a target sampling function value according to the sampling parameter; obtaining correspondences between candidate sampling function values and candidate downsampling proportions; and determining a target downsampling proportion corresponding to the target sampling function value according to the correspondences between the candidate sampling function values and the candidate downsampling proportions.

The target sampling function value is a function value calculated by substituting the sampling parameter into a preset sampling function. The sampling function on the decoding end is the same as the sampling function on the encoding end, and the selected sampling parameter is consistent with the selected sampling parameter on the encoding end.

The preceding video frame is a video frame that has been encoded before a current frame, a preceding video frame corresponding to the current frame may be customized and selected, and there may be one preceding video frame or a plurality of preceding video frames. However, the preceding video frame needs to be kept consistent with the preceding video frame selected on the encoding end.

The sampling parameter includes at least one of: frame information of the current frame to be decoded video frame and encoding information of a preceding video frame corresponding to the current frame. The frame information includes at least one of a frame type, image feature information, and the like. The image feature information is a feature of an image corresponding to a video frame and includes a motion feature, a texture complexity feature, and the like. The encoding information includes at least one of: a frame type, a resolution, a code rate, a ratio of intra-coded blocks to inter-coded blocks (that is, an intraframe/interframe ratio), and the like. The obtained sampling parameter is substituted into a preset sampling fraction, so that a target sampling function value can be obtained. A correspondence between a sampling function value and a downsampling proportion is preset, so that a corresponding target downsampling proportion can be obtained according to a calculated target sampling function value, Subsequently, the current frame is decoded according to the target upsampling proportion corresponding to the target downsampling proportion to obtain the decoded video frame. The target downsampling proportion and the target upsampling proportion are reciprocal.

In an embodiment, the encoding information of the preceding video frame includes resolution information of the preceding video frame. That the target sampling function value is calculated according to the sampling parameter includes: calculating the target sampling function value according to the resolution information of the preceding video frame.

If there is one preceding video frame, the resolution of the preceding video frame is a resolution used when the frame is encoded. If there are a plurality of preceding video frames, the resolution of the preceding video frame may be an average of resolutions of the plurality of frame video frames. Because the resolution of the preceding video frame is reproducible on the decoding end, the resolution of the preceding video frame may be also used as the sampling parameter on the decoding end, and the target sampling function value is calculated according to the resolution information of the preceding video frame. In an embodiment, because adjacent video frames are similar to each other in terms of texture and content as well as encoding complexity, a resolution of the current frame is positively correlated to a resolution of the preceding video frame. That is, a higher resolution of the preceding video frame indicates a higher resolution of the current frame and a lower corresponding downsampling proportion. When the target sampling function value is negatively correlated to the downsampling proportion, correspondingly, the target sampling function value is positively correlated to the resolution of the preceding video frame.

In an embodiment, the encoding information of the preceding video frame further includes at least one of: a ratio of intra-coded blocks to inter-coded blocks of the preceding video frame, a frame type of the preceding video frame, and a code rate of the preceding video frame.

In addition to including the resolution information of the preceding video frame, the sampling parameter further includes at least one of parameters reproducible on the decoding end such as the ratio of intra-coded blocks to inter-coded blocks of the preceding video frame, the frame type of the preceding video frame, and the code rate of the preceding video frame. Corresponding downsampling information can be obtained, without adding the downsampling information to the encoded data, on the decoding end by using the downsampling information obtained according to the parameter reproduced on the decoding end, so that the downsampling information is adaptively selected to improve video quality at a limited bandwidth.

In an embodiment, the downsampling information includes a downsampling method. Obtaining a sampling parameter corresponding to the current frame, and determining downsampling information corresponding to the current frame according to the sampling parameter includes: obtaining a current application corresponding to the current frame; obtaining correspondences between candidate applications and candidate downsampling methods; and determining a target downsampling method corresponding to the current application according to the correspondences between the candidate applications and the candidate downsampling methods.

The current application is an application program to which the current frame currently belongs. Different applications have different requirements for a video. Some applications require real-time performance, that is, require a high encoding speed, and in this case, a downsampling method with low computational complexity is likely to be selected. Some applications require video definition and have low real-time performance requirements, and in this case, a downsampling method with high computational complexity is likely to be selected. Because an application program corresponding to the current frame is the same as an application program corresponding to the input video frame during encoding on the encoding end, a downsampling method used by the encoding end can be obtained according to an application program to which the current frame currently belongs, then, the current frame is decoded according to an upsampling method corresponding to the downsampling method, to obtain the decoded video frame. The upsampling method and the downsampling method may be the same or different, but a correspondence between the downsampling method and the upsampling method is preset.

The target downsampling method corresponding to the current application is determined by obtaining the preset correspondences between the candidate applications and the candidate downsampling methods. The target downsampling method is a sampling method used for downsampling, by the encoding end, the input video frame. Subsequently, the current frame is decoded according to the target upsampling method corresponding to the target downsampling proportion to obtain the decoded video frame.

In an embodiment, the downsampling information includes a downsampling method. Obtaining a sampling parameter corresponding to the current frame, and determining downsampling information corresponding to the current frame according to the sampling parameter includes: obtaining an application type corresponding to the current frame, and obtaining hardware processing capabilities of two communication parties in a case that the application type is a real-time application type; and determining a corresponding sampling method according to the hardware processing capabilities of the two communication parties.

The application types are classified into real-time applications and non-real-time applications. When the application type is a real-time application type, for example, a video call is a real-time application type, and in this case, to obtain hardware processing capabilities of two communication parties is to obtain hardware processing capabilities of the encoding end and the decoding end. The hardware processing capability includes at least one of: CPU utilization, a quantity of cores of a CPU, a CPU memory, a clock speed, a system type, and a model type. The system type is a type of an operating system used by a current terminal, for example, an IOS system, an Android system, or a Windows system. When other conditions are the same, different systems correspond to different processing capabilities. Therefore, the system type may be used as a condition for determining a downsampling proportion. The CPU utilization, the quantity of cores of a CPU, the CPU memory, the clock speed, the model type, and the like are all parameters representing hardware processing capabilities. Generally, for a stronger processing capability, a lower downsampling proportion is likely to be selected, that is, a processed resolution is higher. In an embodiment, correspondences between candidate hardware processing capabilities and candidate downsampling methods are preset, and after the hardware processing capabilities of the encoding end and the decoding end are obtained, the corresponding downsampling method can be obtained. In another embodiment, computational complexity that can be afforded is calculated according to the hardware processing capabilities of the two communication parties, and then, a corresponding downsampling method is obtained according to the computational complexity. To satisfy requirements of the two communication parties on real-time performance, the hardware processing capabilities of both the two communication parties are taken into consideration, to select a most suitable downsampling method for processing the input video frame, thereby improving a video encoding/decoding speed while ensuring video quality.

In an embodiment, the downsampling information includes a downsampling proportion. Decoding the encoded data according to the downsampling information corresponding to the video to be decoded to obtain a corresponding decoded video frame includes: decoding the encoded data according to the downsampling proportion corresponding to the current frame to obtain a reconstructed video frame corresponding to the current frame; and upsampling the reconstructed video frame according to an upsampling proportion corresponding to the downsampling proportion to obtain the decoded video frame.

The downsampling information includes a downsampling proportion. An upsampling proportion selected for upsampling the reconstructed video frame and a downsampling proportion on the encoding end are reciprocal. First, the encoded data is decoded according to the downsampling proportion to obtain the reconstructed video frame. Because a resolution of the reconstructed video frame is relatively low, the reconstructed video frame needs to be upsampled to obtain the final decoded video frame.

In an embodiment, decoding the encoded data according to the downsampling proportion corresponding to the current frame to obtain a reconstructed video frame corresponding to the current frame includes: obtaining a reference frame corresponding to the current frame; determining resolution information corresponding to the current frame according to the downsampling proportion corresponding to the current frame; processing the reference frame according to the resolution information to obtain a target reference frame; and decoding the encoded data according to the target reference frame to obtain the reconstructed video frame corresponding to the current frame.

During encoding, the encoding needs to be performed according to a reference frame, and similarly, during decoding, the decoding also needs to be performed according to the reference frame. A reference frame corresponding to the current frame is obtained, resolution information corresponding to the reference frame is determined according to the downsampling proportion, then, the reference frame is sampled (upsampled or downsampled) according to the resolution information to obtain a target reference frame having the same resolution information as that of the current frame, further, the encoded data is decoded according to the target reference frame, to obtain a reconstructed video frame, and subsequently, the reconstructed video frame is upsampled according to an upsampling proportion corresponding to the downsampling proportion to obtain the decoded video frame.

In an embodiment, the downsampling information further includes a downsampling method. Upsampling the reconstructed video frame according to an upsampling proportion corresponding to the downsampling proportion to obtain the decoded video frame includes upsampling the reconstructed video frame according to the upsampling proportion corresponding to the downsampling proportion by using an upsampling method corresponding to the downsampling method to obtain the decoded video frame.

After the encoded data is decoded to obtain the reconstructed video frame, a matching upsampling method is obtained according to the obtained downsampling method, then, the reconstructed video frame is upsampled by using the upsampling method according to the upsampling proportion corresponding to the downsampling proportion, to obtain the decoded video frame.

Figure 19:
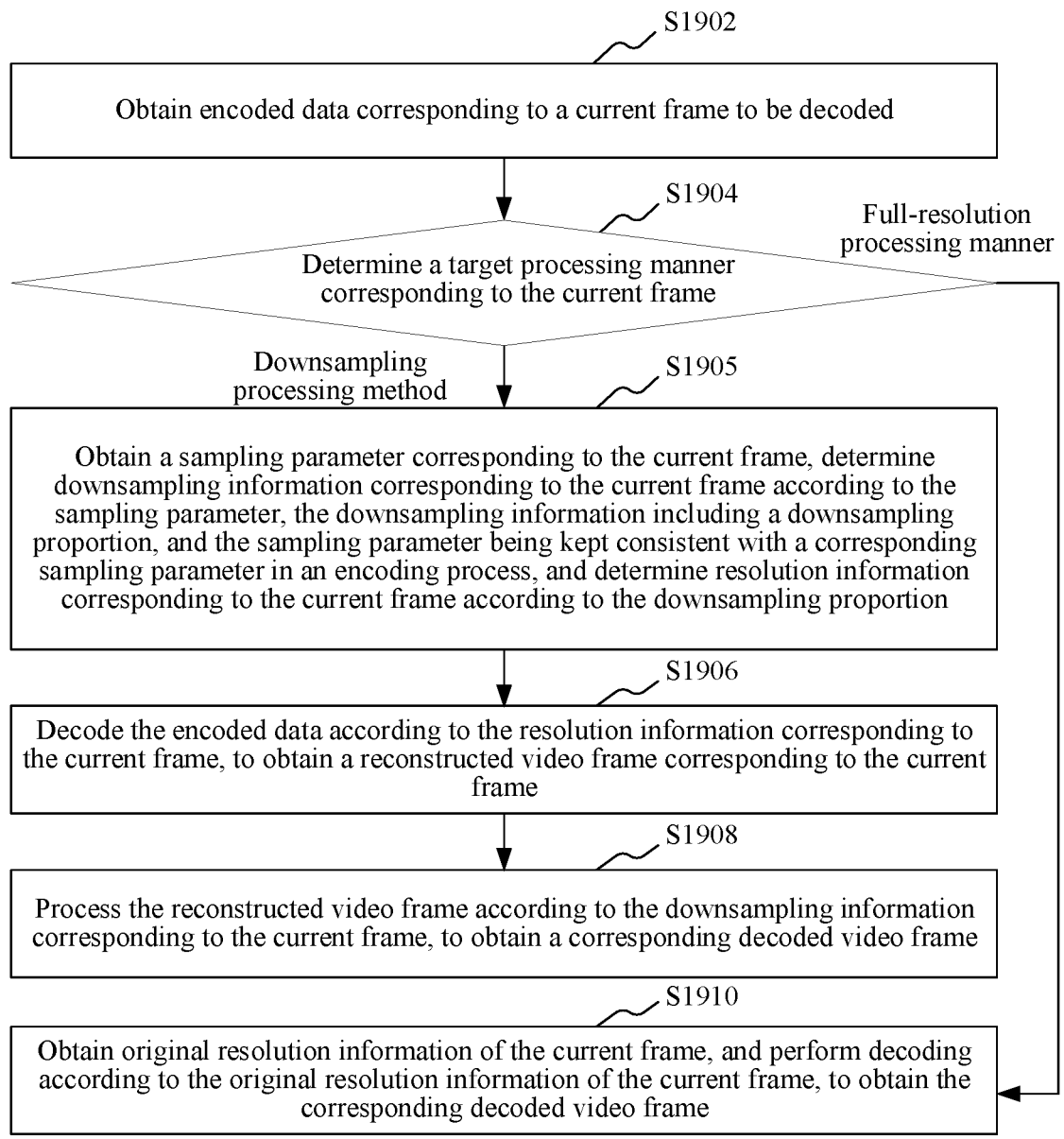
FIG. 19 is a flowchart of a video decoding method in another embodiment of this application.

As shown in FIG. 19, in an embodiment, a video decoding method is provided, including the following steps:

Step S1902: Obtain encoded data corresponding to a current frame.

Step S1904: Determine a target processing method corresponding to the current frame, in a case that the target processing method is a downsampling processing method, perform step S1905, and in a case that the target processing method is a full-resolution processing method, perform step S1910.

Step S1905: Obtain a sampling parameter corresponding to the current frame, determine downsampling information corresponding to the current frame according to the sampling parameter, the downsampling information including a downsampling proportion, and the sampling parameter being kept consistent with a corresponding sampling parameter in an encoding process, and determine resolution information corresponding to the current frame according to the downsampling proportion.

Step S1906: Decode the encoded data according to the resolution information corresponding to the current frame, to obtain a reconstructed video frame corresponding to the current frame.

The reconstructed video frame is a video frame obtained through decoding and reconstruction. It may be understood that, resolution information corresponding to the reconstructed video frame corresponds to resolution information of a current frame in an encoding process. If there is no loss of image information in the encoding process, the reconstructed video frame is the same as the current frame, and if there is a loss of image information in the encoding process, a difference between the reconstructed video frame and the current frame corresponds to a loss value. The encoded data is decoded by using the resolution information corresponding to the current frame. Decoding may include at least one of prediction, inverse transform, inverse quantization, and entropy decoding, and may be specifically determined according to an encoding process. During decoding, at least one of a reference frame, location information corresponding to each current block of the current frame, location information corresponding to each reference block in the reference frame, and a motion vector is processed according to the resolution information of the current frame. The processing method matches a processing method used by an encoding end for encoding. For example, the reference frame corresponding to the current frame may be obtained, and the reference frame is processed according to the resolution information corresponding to the current frame, to obtain a target reference frame. The target reference block is obtained according to carried motion vector information, a predicted value corresponding to the current block is obtained according to the target reference block, and the reconstructed video frame is obtained according to a prediction residual in the encoded data and the predicted value.

In an embodiment, when the encoding end transforms location information, the location information needs to be correspondingly transformed when the corresponding location information is obtained in a decoding process, to keep consistency between the target reference blocks obtained by the encoding end and the decoding end.

In an embodiment, when the motion vector information carried in the encoded data is a target motion vector, the target motion vector may be transformed according to target motion vector unit resolution information and the resolution information corresponding to the current frame, to obtain a first motion vector at the resolution information corresponding to the current frame, and obtain a target reference block corresponding to the current block according to the first motion vector.

In an embodiment, when the motion vector information carried in the encoded data is a motion vector difference, an initial predicted motion vector corresponding to a current block to be decoded is obtained, a motion vector difference corresponding to each current block and the initial predicted motion vector are processed at the same resolution, to obtain a first motion vector that corresponds to a corresponding current block and that is at a resolution of the current frame, and a target reference block corresponding to the current block is obtained according to the first motion vector.

For example, both the motion vector difference and the initial predicted motion vector are transformed into motion vectors corresponding to the same resolution. For example, the initial predicted motion vector may be transformed into a target predicted motion vector at the target resolution, the target motion vector is obtained according to the target predicted motion vector and the motion vector difference, and then the target motion vector is transformed into the first motion vector at the resolution of the current frame. The initial predicted motion vector may alternatively be transformed into a predicted motion vector at the resolution of the current frame, the motion vector difference is transformed into a motion vector difference at the resolution of the current frame, and the first motion vector is obtained according to the motion vector difference at the resolution of the current frame and the predicted motion vector at the resolution of the current frame.

Step S1908: Process the reconstructed video frame according to the downsampling information corresponding to the current frame, to obtain a corresponding decoded video frame.

Processing performed on the reconstructed video frame may be sampling processing, for example, upsampling processing. A method for processing the reconstructed video frame may correspond to a method for processing the input video frame during encoding. For example, when the processing method of the input video frame is the downsampling processing method, and the downsampling proportion is 2/1, the reconstructed video frame is upsampled, and the upsampling proportion may be ½.

The sampling method is a downsampling method, and the reconstructed video frame is upsampled by using an upsampling method corresponding to the downsampling method to obtain the decoded video frame. In an embodiment, when the decoding end determines from header information of the encoded data that the encoded data is obtained through encoding in the downsampling processing method, the decoding end may alternatively obtain, from the header information, the used downsampling method information, and upsample the reconstructed video frame by using an upsampling method that matches the downsampling method information, to obtain the decoded video frame. The decoding end may obtain, from any one of sequence-level header information, group-level header information, and frame-level header information, downsampling method information corresponding to the current encoded data.

Step S1910: Obtain original resolution information of the current frame, and perform decoding according to the original resolution information of the current frame, to obtain the corresponding decoded video frame.

When the target processing method is the full-resolution processing method, decoding is performed directly according to the original resolution information of the current frame, to obtain the decoded video frame.

According to the foregoing video decoding method, the encoded data corresponding to the current frame is obtained, the resolution information and the sampling method corresponding to the current frame are obtained, the encoded data is decoded according to the resolution information corresponding to the current frame, to obtain the reconstructed video frame corresponding to the current frame, and the reconstructed video frame is processed according to the resolution information and the sampling method corresponding to the current frame, to obtain the corresponding decoded video frame. Therefore, during decoding, decoding may be flexibly performed according to the resolution information and the sampling method corresponding to the current frame, to obtain the decoded video frame, so that quality of a video obtained through video decoding is improved at a limited bandwidth.

In an embodiment, reconstructed video frames corresponding to current frames of the video sequence to be decoded are processed into the same resolution, and for example, the reconstructed video frame is processed into a decoded video frame that has a resolution the same as the original resolution of the input video frame.

In an embodiment, step S1906, that is, decoding the encoded data according to the resolution information corresponding to the current frame to obtain a reconstructed video frame corresponding to the current frame includes: obtaining a reference frame corresponding to the current frame; and decoding the encoded data according to the resolution information corresponding to the current frame and the reference frame to obtain the reconstructed video frame corresponding to the current frame.

There may be one or more reference frames corresponding to the current frame. For example, when the current frame is a P-frame, there may be one corresponding reference frame. For example, when the current frame is a B-frame, there may be two corresponding reference frames. A reference frame corresponding to the current frame may be obtained according to a reference relationship, and the reference relationship may be different according to video encoding and decoding standards. For example, when the second video frame in a GOP is a B-frame, a corresponding current frame may be an I-frame of the video group and the fourth frame of the video frame. Alternatively, the reference frame corresponding to the current frame may be first one or two frames in forward-encoded frames thereof. It may be understood that, the reference frame is consistent with the reference frame in the encoding process.

In an embodiment, the obtaining a reference frame corresponding to the current frame includes: obtaining a second reference rule, the second reference rule including a size relationship between a resolution of the current frame and a resolution of the reference frame; and obtaining the reference frame corresponding to the current frame according to the second reference rule.

The second reference rule determines the size relationship between the resolution of the current frame and the resolution of the reference frame. It may be understood that, to ensure consistency between the reference frame obtained in the encoding process and the reference frame obtained in the decoding process, the first reference rule is consistent with the second reference rule. The first reference rule and the second reference rule may be preset in an encoding and decoding standard. Alternatively, during encoding, the first reference rule may be selected according to an application scenario, a real-time performance requirement, and the like of encoding, and reference rule information is added to the encoded data. A decoder obtains the second reference rule according to the reference rule information in the encoded data. The resolution size relationship includes at least of that the current frame is the same as the reference frame and that the current frame is different from the reference frame. When the second reference rule includes that the resolution of the current frame is the same as the resolution of the reference frame, the second reference rule may further include a processing method reference rule of the resolution of the current frame and the reference frame. For example, the processing method reference rule may include one or two of the following: for a current frame to be decoded in a full-resolution processing method, a reference frame in a full-resolution processing method may be referred to, and for a current frame to be decoded in a downsampling processing method, a reference frame in a downsampling processing method may be referred to. When the second reference rule includes that the resolution of the current frame is different from the resolution of the reference frame, the second reference rule may further include one or two of the following: the resolution of the current frame is greater than or less than the resolution of the reference frame. Therefore, the second reference rule may include one or more of the following: a current frame with an original resolution may refer to a reference frame with a downsampling resolution, a current frame with a downsampling resolution may refer to a reference frame with an original resolution, a current frame with an original resolution may refer to a reference frame with an original resolution, and a current frame with a downsampling resolution may refer to a reference frame with a downsampling resolution. The current frame with an original resolution indicates that the resolution of the current frame is the same as the resolution of the corresponding input video frame, and the reference frame with an original resolution indicates that the resolution of the reference frame is the same as the resolution of the corresponding input video frame. The current frame with a downsampling resolution refers to that resolution information corresponding to the current frame is downsampling. The reference frame with a downsampling resolution refers to that the resolution information corresponding to the reference frame is downsampling. After the second reference rule is obtained, the reference frame corresponding to the current frame is obtained according to the second reference rule, so that the obtained reference frame meets the second reference rule.

In an embodiment, a reference block corresponding to a current block of the current frame may be obtained from the reference frame, and the current block is decoded according to the reference block. Alternatively, the reference frame may be processed according to the resolution information of the current frame, to obtain a corresponding target reference frame, a target reference block corresponding to the current block of the current frame is obtained from the target reference frame, and the current block is decoded according to the target reference block, to obtain the reconstructed video frame corresponding to the current frame.

In an embodiment, decoding the encoded data according to the resolution information corresponding to the current frame and the reference frame, to obtain the reconstructed video frame corresponding to the current frame includes: sampling the reference frame according to the resolution information corresponding to the current frame, to obtain a corresponding target reference frame; and decoding the current frame according to the target reference frame, to obtain the reconstructed video frame corresponding to the current frame.

The target reference block is obtained from the target reference frame according to carried motion vector information, a predicted value corresponding to the current block is obtained according to the target reference block, and the reconstructed video frame is obtained according to a prediction residual in the encoded data and the predicted value.

In an embodiment, sampling the reference frame according to the resolution information corresponding to the current frame to obtain a corresponding target reference frame includes: processing the reference frame according to the resolution information of the current frame and motion estimation pixel precision, to obtain the corresponding target reference frame.

In an embodiment, the sampling the reference frame according to the resolution information of the current frame and motion estimation pixel precision, to obtain the corresponding target reference frame includes: calculating pixel interpolation precision according to the resolution information of the current frame and the motion estimation pixel precision; and directly performing subpixel interpolation on the reference frame according to the pixel interpolation precision, to obtain the corresponding target reference frame.

In an embodiment, the sampling the reference frame according to the resolution information of the current frame and motion estimation pixel precision, to obtain the corresponding target reference frame includes: sampling the reference frame according to the resolution information of the current frame, to obtain an intermediate reference frame; and performing subpixel interpolation on the intermediate reference frame according to the motion estimation pixel precision, to obtain the target reference frame.

The resolution of the current frame is consistent with the resolution of the current frame to be encoded, and the obtained target reference frames are also consistent. Therefore, a method for sampling the reference frame according to the resolution information corresponding to the current frame, to obtain the corresponding target reference frame is consistent with a method for sampling the reference frame according to the resolution information of the current frame in the encoding end, to obtain the corresponding target reference frame. Details are not described herein again in this embodiment of this application.

In an embodiment, the decoding end may also obtain, from header information of the encoded data, sampling manner information corresponding to the current frame. Specifically, subpixel interpolation manner information corresponding to the current frame may be obtained from any one of sequence-level header information, group-level header information, and frame-level header information. For example, when a flag bit Pixel_Source_Interpolation used for determining the sampling processing method in the frame-level header information of the encoded data is 0, it indicates that the subpixel interpolation is directly performed on the reference frame corresponding to the input video frame; and when Pixel_Source_Interpolation is 1, it indicates that sampling is first performed on the reference frame corresponding to the input video frame, and then subpixel interpolation is performed on the reference frame. The decoding end may perform subpixel interpolation on the reference frame in a manner the same as the subpixel interpolation manner indicated by the flag bit in the encoded data, to obtain the target reference frame, so that the encoded data may be decoded according to the target reference frame, to obtain the reconstructed video frame.

Figure 20:
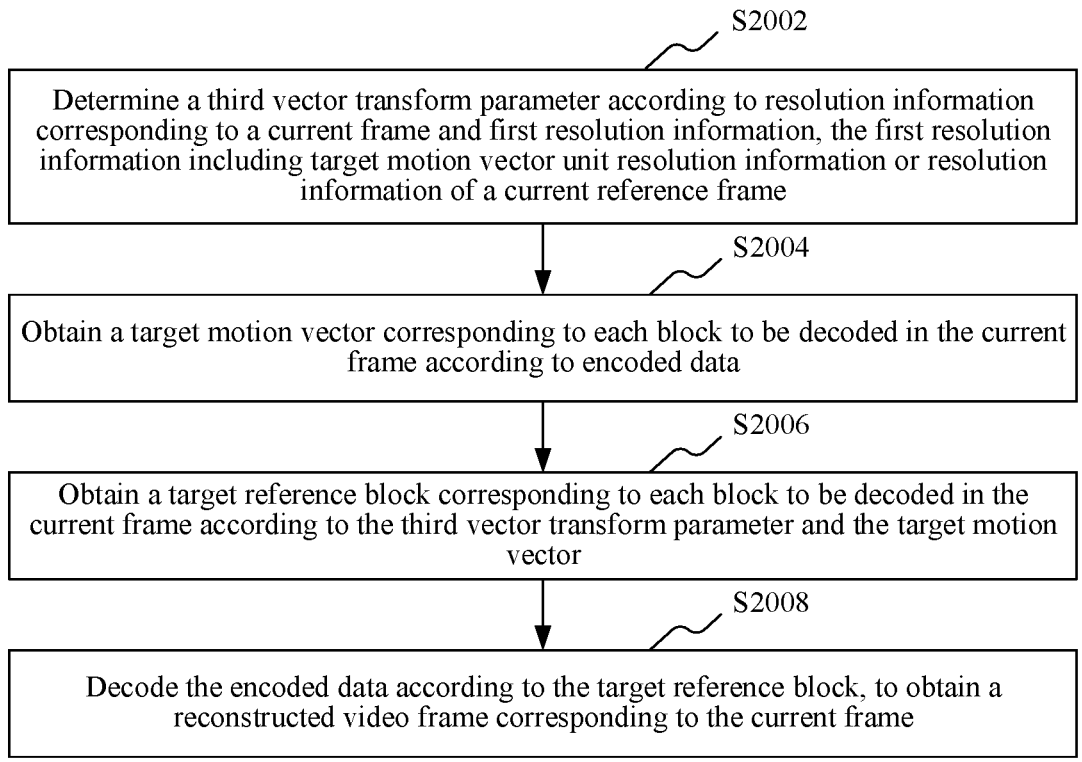
FIG. 20 is a flowchart of obtaining a reconstructed video frame in an embodiment of this application.

As shown in FIG. 20, in an embodiment, step S1906B, that is, decoding the encoded data according to the resolution information corresponding to the current frame and the reference frame, to obtain the reconstructed video frame corresponding to the current frame includes the following steps.

Step S2002: Determine a third vector transform parameter according to the resolution information corresponding to the current frame and first resolution information, the first resolution information including target motion vector unit resolution information or resolution information of the reference frame.

The third vector transform parameter is used for transforming obtained location information of a motion vector or the motion vector. The third vector transform parameter may be a ratio of the first resolution information to the resolution information of the current frame, and the third vector transform parameter corresponds to the first vector transform parameter. When the target motion vector is transformed by using the third vector transform parameter, the target motion vector may be transformed into a motion vector corresponding to a resolution corresponding to the current frame, and the third vector transform parameter may be a reciprocal of the first vector transform parameter. When location information corresponding to the motion vector is transformed by using the third vector transform parameter, if the first vector transform parameter in the encoding end is used for transforming the first location information, because the location information of the current block is the same as that of the coded block, the third vector transform parameter is the same as the first vector transform parameter. If the first vector transform parameter in the encoding end is used for transforming the second location information, because a location value calculated according to the target motion vector and the first location information is a location value obtained after the second location information is transformed according to the first vector transform parameter in the encoding end, the third vector transform parameter is a reciprocal of the first vector transform parameter.

Step S2004: Obtain a target motion vector corresponding to each current block in the current frame according to the encoded data.

When the encoded data carries the target motion vector, the target motion vector is read from the encoded data. When the encoded data carries the motion vector difference, the target predicted motion vector may be calculated, and the target motion vector is obtained according to the motion vector difference and the target predicted motion vector.

Step S2006: Obtain a target reference block corresponding to each current block in the current frame according to the third vector transform parameter and the target motion vector.

After the third vector transform parameter is obtained, the obtained motion vector or the location information corresponding to the motion vector is obtained according to the third vector transform parameter, to obtain the location information corresponding to the target reference block, thereby obtaining the target reference block.

Step S2008: Decode the encoded data according to the target reference block to obtain a reconstructed video frame corresponding to the current frame.

After the target reference block is obtained, a pixel value of each image block of the reconstructed video frame is obtained according to a pixel value of the target reference block and the prediction residual that is of the current block and that is carried in the encoded data, to obtain the reconstructed video frame.

In an embodiment, step S2002, that is, determining a third vector transform parameter according to the resolution information corresponding to the current frame and first resolution information, includes: determining a third vector transform parameter according to the resolution information corresponding to the current frame and resolution information of the reference frame, and step S2006, that is, obtaining a target reference block corresponding to each current block in the current frame according to the third vector transform parameter and the target motion vector, includes: obtaining first location information corresponding to a current block to be decoded; and obtaining a target reference block corresponding to the current block to be decoded according to the first location information, the third vector transform parameter, and the target motion vector.

The second location information corresponding to the target reference block may be obtained according to the first location information, the third vector transform parameter, and the target motion vector, and the target reference block is obtained according to the second location information. Due to correspondence between encoding and decoding, if the first vector transform parameter in the encoding end is used for transforming the first location information, because the location information of the current block is the same as that of the coded block, the third vector transform parameter is the same as the first vector transform parameter. If the first vector transform parameter in the encoding end is used for transforming the second location information, because a location value calculated according to the target motion vector and the first location information is a location value obtained after the second location information is transformed according to the first vector transform parameter in the encoding end, the third vector transform parameter is a reciprocal of the first vector transform parameter.

For example, the resolution of the current frame is 1200*1200 pixels, and the resolution of the reference frame is 600*600 pixels. If the first vector transform parameter is used for transforming the second location information, and the first vector transform parameter is 2, and the third vector transform parameter is ½. Assuming that the first location information is (6, 8), and the target motion vector is (0, 2), the intermediate location information is (6, 8)–(0, 2)=(6, 6), and the second location information corresponding to the target reference block is (6*½, 6*½)=(3, 3).

For example, if the resolution of the current frame is 1200*1200 pixels, the resolution of the reference frame is 600*600 pixels, the first vector transform parameter is used for transforming the first location information, and the first vector transform parameter is ½, the third vector transform parameter is ½. Assuming that the first location information is (6, 8), the target motion vector is (0, 1), and the second location information is (6*½, 8*½)–(0, 1)=(3, 3).

In an embodiment, step S2002, that is, determining a third vector transform parameter according to the resolution information corresponding to the current frame and first resolution information includes: determining a third vector transform parameter according to the resolution information corresponding to the current frame and target motion vector unit resolution information, and step S2006, that is, obtaining a target reference block corresponding to each current block in the current frame according to the third vector transform parameter and the target motion vector includes: obtaining a first motion vector according to the target motion vector and the third vector transform parameter; and obtaining a target reference block corresponding to a current block to be decoded according to the first motion vector.

The third vector transform parameter is determined according to the resolution information corresponding to the current frame and the target motion vector unit resolution information, and is used for transforming the target motion vector into a first motion vector corresponding to the resolution corresponding to the current frame to be decoded. After the third vector transform parameter is obtained, the third vector transform parameter may be multiplied by the target motion vector, and the obtained product is used as the first motion vector. It may be understood that, the process of obtaining the first motion vector according to the third vector transform parameter and the target motion vector is an inverse process of obtaining the target motion vector corresponding to the current coded block according to the first vector transform parameter and the first motion vector. For example, if in the encoding end, the first vector transform parameter of the coded block corresponding to the current block is equal to 2, the obtained first motion vector is (2, 2), and the target motion vector obtained according to a product of the first vector transform parameter and the first motion vector (2, 2) is (4, 4), then in the decoding process, the third vector transform parameter is ½, the obtained target motion vector is (4, 4), and the first motion vector obtained according to a product of the third vector transform parameter ½ and the target motion vector (4, 4) is (2, 2).

In an embodiment, when the encoded data carries the motion vector difference, obtaining a target motion vector corresponding to each current block in the current frame according to the encoded data includes: obtaining a motion vector difference corresponding to a current block to be decoded in the current frame according to the encoded data;

obtaining an initial predicted motion vector corresponding to the current block to be decoded; obtaining a second vector transform coefficient according to current motion vector unit resolution information corresponding to the initial predicted motion vector and the target motion vector unit resolution information; obtaining a target predicted motion vector corresponding to the current block to be decoded according to the initial predicted motion vector and the second vector transform coefficient; and obtaining the target motion vector according to the target predicted motion vector and the motion vector difference.

Because the current block in the decoding process corresponds to the current block to be encoded in the encoding process, and initial predicted motion vector obtaining rules are the same, the initial predicted motion vector corresponding to the current block to be decoded is consistent with the initial predicted motion vector corresponding to the current block, and for the method for obtaining the target predicted motion vector, reference may be made to the method in the encoding process, and details are not described herein again. The target motion vector is a sum of the target predicted motion vector and the motion vector difference.

In an embodiment, a proportion of a target prediction-type decoded block in a forward-decoded video frame corresponding to the current frame may alternatively be calculated; a processing method corresponding to the current frame is determined according to the proportion; and the resolution information corresponding to the current frame is obtained according to the processing method.

The target prediction-type decoded block corresponds to the target prediction-type coded block. The forward-decoded video frame is a video frame obtained by decoding the current frame. The forward-decoded video frame also corresponds to the forward-encoded video frame. Therefore, a method for calculating the proportion of the target prediction-type coded block obtained by the encoding end and the calculation result are also consistent with a method for calculating the proportion of the target prediction-type decoded block obtained by the decoding end and the calculation result, and for the method for obtaining the proportion of the target prediction-type decoded block, reference may be made to the method for obtaining the proportion of the target prediction-type coded block, and details are not described herein again. After the processing method is obtained, when the processing method is the full-resolution processing method, the corresponding resolution information is an original resolution. When the processing method is the downsampling processing method, a preset downsampling proportion is obtained, or a downsampling proportion is obtained from header information of the encoded data.

In an embodiment, a proportion of the intra-decoded block of the forward-decoded video frame in the forward-decoded video frame may be calculated, and when the proportion is greater than a target threshold, the processing method is determined as the downsampling processing method.

For the proportion corresponding to the intra-frame decoded block, when the proportion is greater than the target threshold, the target processing method corresponding to the current frame may be determined as the downsampling processing method, and otherwise, the target processing method corresponding to the video frame is determined as the full-resolution processing method. For example, when the proportion is greater than the target threshold, the processing method corresponding to the current frame is determined as the downsampling processing method, and otherwise, the target processing method corresponding to the video frame is determined as the full-resolution processing method.

The target threshold may be determined according to a processing method of the reference frame corresponding to the current frame. When the processing method of the reference frame corresponding to the current frame is the downsampling processing method, a first preset threshold T1 is obtained, and the first preset threshold T1 is used as a target threshold. Similarly, when the processing method of the reference frame corresponding to the current frame is the full-resolution processing method, a second preset threshold T2 is obtained, and the second preset threshold T2 is used as a target threshold. Further, after the target threshold is obtained according to the resolution information of the reference frame corresponding to the current frame, the processing method of the current frame is determined according to the target threshold and the proportion of the intra-decoded block of the forward-decoded video frame in the forward-decoded video frame. When the proportion of the intra-decoded block of the forward-decoded video frame in the forward-decoded video frame is greater than the target threshold, the processing method corresponding to the current frame is determined as the downsampling processing method.

In an embodiment, before obtaining encoded data corresponding to a current frame, the method further includes: obtaining a video sequence to be decoded corresponding to the current frame, and obtaining a target video sequence decoding mode corresponding to the video sequence to be decoded, the target video sequence decoding mode including a constant-resolution decoding mode or a hybrid-resolution decoding mode; performing the hybrid-resolution video decoding method on each current frame of the video sequence to be decoded in a case that the target video sequence decoding mode is the hybrid-resolution decoding mode; and performing constant-resolution decoding on the video sequence to be decoded in a case that the video sequence decoding mode is the constant-resolution decoding mode.

Video sequence encoding mode information may be obtained from the encoded data, and the video sequence decoding mode is obtained according to the video sequence encoding mode information. For example, when the video sequence encoding mode corresponding to the video sequence encoding mode information is the constant-resolution encoding mode, the corresponding video sequence decoding mode is a constant-resolution decoding mode. In the constant-resolution decoding mode, resolutions of the current frames of the video sequence are consistent. When the video sequence encoding mode corresponding to the video sequence encoding mode information is a hybrid-resolution encoding mode, the corresponding video sequence decoding mode is the hybrid-resolution decoding mode.

In an embodiment, a decoding framework corresponding to the current frame may be determined from header information of the encoded data. The decoding end may obtain, from sequence-level header information corresponding to the encoded data, an encoding framework used when each input video frame in the input video frame sequence corresponding to the current encoded data is encoded, to determine a decoding framework that is of the current frame and that matches the encoding framework. For example, when a flag bit Sequence_Mix_Flag used for determining the used encoding framework in the sequence-level header information of the encoded data is 0, it indicates that the encoding framework with a constant-resolution is used when each input video frame in the input video frame sequence is encoded, and the decoding end may decode the encoded data by using a decoding framework with a constant-resolution, to obtain a reconstructed video frame corresponding to the current frame. When flag bit Sequence_Mix_Flag is 1, it indicates that the encoding framework with a hybrid-resolution is used when each input video frame in the input video frame sequence is encoded, and the decoding end may decode the encoded data by using a decoding framework with a hybrid-resolution, to obtain a reconstructed video frame sequence.

In an embodiment, obtaining a video sequence decoding mode corresponding to the video sequence to be decoded may include: obtaining current environment information, the current environment information including at least one of current encoding environment information and current decoding environment information; and determining the target video sequence decoding mode corresponding to the video sequence to be decoded according to the current environment information.

The decoding end may alternatively obtain the corresponding target video sequence decoding mode by using a method for calculating the video sequence encoding mode by the encoding end. Therefore, in this embodiment of this application, determining the target video sequence decoding mode according to current environment information is consistent with determining the target video sequence encoding mode according to the current environment information, and details are not described herein again.

In an embodiment, the current environment information includes an application scenario corresponding to the video sequence to be decoded, and the video sequence decoding mode corresponding to the video sequence to be decoded may be obtained according to the application scenario.

The video decoding method is described below by using an example in which encoded data corresponding to a video sequence A is decoded. It is assumed that names of current frames corresponding to input video frames a, b, and c on the decoding end are respectively e, f, and g.

1. A receiving terminal obtains the encoded data corresponding to the video sequence A, and obtains, from sequence header information corresponding to the encoded data, that the target video sequence encoding mode is the hybrid-resolution encoding mode, and therefore, decodes the encoded data by using a hybrid-resolution decoding framework.

2. A resolution information obtaining unit of the hybrid-resolution decoding framework obtains resolution information corresponding to the first current frame e. It may be understood that, the encoded data corresponding to e is data obtained by encoding a1. Intra-frame decoding is performed on e, to obtain a reconstructed video frame e1. Because the resolution information corresponding to e is ½, the reconstructed video frame e1 may be upsampled by using a sampling proportion of ½, to obtain a decoded video frame e2.

3. The resolution information obtaining unit of the hybrid-resolution decoding framework obtains resolution information corresponding to the second current frame f. It may be understood that, the encoded data corresponding to f is data obtained by encoding b1. Inter-frame decoding is performed on f, to obtain a reconstructed video frame f1. Because the resolution information corresponding to f is a downsampling proportion of 4/1, the reconstructed video frame f1 may be upsampled by using a sampling proportion of ¼, to obtain a decoded video frame f2.

The decoding process is as follows: because f is an inter-predicted frame, the reconstructed video frame e1 needs to be used as the reference frame. It may be understood that, e1 is the same as a2, and sampling the same as that performed on a2 is performed on e1, to obtain e3, and herein, e3 is the same as a3, and is a target reference frame. It is obtained from the encoded data that the motion vector difference corresponding to the current block to be decoded is MVD1, because MVD1 is at the target resolution, that is, the original resolution, MVD1 needs to be transformed to be at a resolution corresponding to f, and therefore, it may be obtained that MVD3 is MVD1/4. It is obtained that an initial predicted vector is MV2. The initial predicted vector is calculated at a resolution corresponding to the downsampling proportion of 4/1, and the resolution is the same as a resolution corresponding to f Therefore, it may be obtained that the first motion vector is MV1, equal to MVD1/4+MV2. The target reference block is obtained according to MV1. A predicted value corresponding to the current block is obtained according to the target reference block, and the reconstructed block corresponding to the reconstructed video frame f1 is obtained through reconstruction by adding the prediction residual p1 to the predicted value.

4. The hybrid-resolution information obtaining unit of the hybrid-resolution decoding framework obtains encoded data corresponding to the third current frame g. It may be understood that, the encoded data corresponding to g is data obtained by encoding c1. Inter-frame decoding is performed on g, to obtain a reconstructed video frame g1. Because resolution information corresponding to g is ⅛, the reconstructed video frame f1 may be upsampled by using a sampling proportion of ⅛, to obtain a decoded video frame g2.

The decoding process is as follows: because g is an inter-predicted frame, the reconstructed video frame f1 needs to be used as the reference frame. It may be understood that, f1 is the same as b2, and sampling the same as that performed on b2 is performed on f1, to obtain f3, and herein, f3 is the same as b3, and is a target reference frame. It is obtained from the encoded data that the motion vector difference corresponding to the current block to be decoded is MVD2, because MVD2 is at the target resolution, that is, the original resolution, MVD2 needs to be transformed to be at a resolution corresponding to g, and therefore, it may be obtained that MVD2 is MVD1/8. It is obtained that an initial predicted vector is MV4, and because the initial predicted vector is calculated at a resolution corresponding to the downsampling proportion of 4/1, the initial predicted vector needs to be transformed to be at a resolution corresponding to f A downsampling proportion corresponding to f is 8/1. Therefore, it may be obtained that the first motion vector is MV3, equal to MVD2/8+MV4/2. The target reference block is obtained according to MV3. A predicted value corresponding to the current block is obtained according to the target reference block, and the reconstructed block corresponding to the reconstructed video frame g1 is obtained through reconstruction by adding the prediction residual p2 to the predicted value.

5. The receiving terminal plays e2, f2, and g2.

Figure 21:
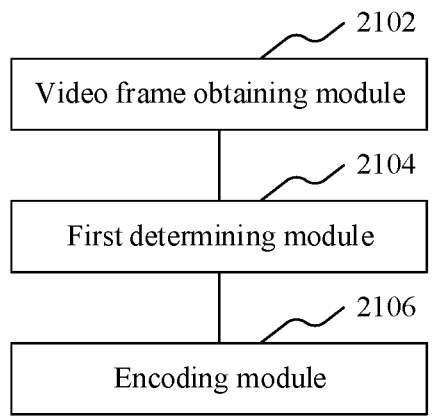
FIG. 21 is a structural block diagram of a video encoding apparatus in an embodiment of this application.

As shown in FIG. 21, in an embodiment, a video encoding apparatus is provided. The apparatus has functions of implementing the foregoing video encoding method. The functions may be implemented by using hardware, or may be implemented by hardware executing corresponding software. The apparatus may be a computer device or may be disposed in a computer device. The computer device may be a terminal or a server.

The apparatus may include: a video frame obtaining module 2102, configured to obtain an input video frame; a first determining module 2104, configured to: obtain, in a case that a target processing method corresponding to the input video frame is determined as a downsampling processing method, a sampling parameter corresponding to the input video frame, and determine downsampling information corresponding to the input video frame according to the sampling parameter, the sampling parameter being reproduced in a decoding process; and an encoding module 2106, configured to encode the input video frame according to the downsampling information to obtain encoded data corresponding to the input video frame.

In an embodiment, the sampling parameter includes: the encoded data transmitted to the decoding end and/or processed data obtained according to the encoded data transmitted to the decoding end.

In an embodiment, the downsampling information includes a downsampling proportion; the sampling parameter includes at least one of: frame information of the input video frame and encoding information of a preceding video frame corresponding to the input video frame; and the first determining module is further configured to: calculate a target sampling function value according to the sampling parameter; obtain correspondences between candidate sampling function values and candidate downsampling proportions; and determine a target downsampling proportion corresponding to the target sampling function value according to the correspondences between the candidate sampling function values and the candidate downsampling proportions.

In an embodiment, the encoding information of the preceding video frame includes resolution information of the preceding video frame; and the first determining module is further configured to: calculate the target sampling function value according to the resolution information of the preceding video frame.

In an embodiment, the encoding information of the preceding video frame further includes at least one of: a ratio of intra-coded blocks to inter-coded blocks of the preceding video frame, a frame type of the preceding video frame, and a code rate of the preceding video frame.

In an embodiment, the downsampling information includes a downsampling method; and the first determining module is further configured to: obtain a current application corresponding to the input video frame; obtain correspondences between candidate applications and candidate downsampling methods; and determine a target downsampling method corresponding to the current application according to the correspondences between the candidate applications and the candidate downsampling methods.

In an embodiment, the downsampling information includes a downsampling method; and the first determining module is further configured to: obtain an application type corresponding to the input video frame, and obtain hardware processing capabilities of two communication parties in a case that the application type is a real-time application type; and determine a corresponding sampling method according to the hardware processing capabilities of the two communication parties.

In an embodiment, the downsampling information includes a downsampling proportion; and the first determining module is further configured to: process the input video frame according to the downsampling proportion to obtain a current frame; obtain a reference frame corresponding to the current frame; and encode the current frame according to the reference frame to obtain the encoded data corresponding to the input video frame.

In an embodiment, the encoding module is further configured to: obtain the downsampling proportion corresponding to the current frame, and process the reference frame according to the downsampling proportion to obtain a target reference frame; and encode the current frame according to the target reference frame to obtain the encoded data corresponding to the input video frame.

In an embodiment, the downsampling information further includes a downsampling method; and the encoding module is further configured to downsample the input video frame according to the downsampling proportion by using the downsampling method to obtain the current frame.

Figure 22:
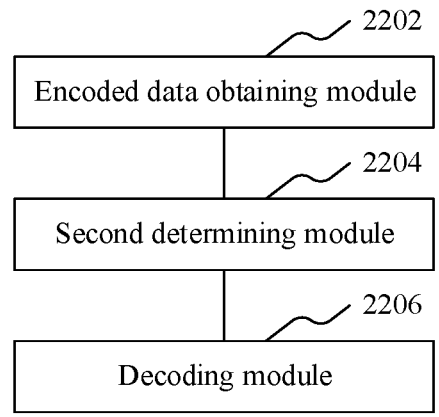
FIG. 22 is a structural block diagram of a video decoding apparatus in an embodiment of this application.

As shown in FIG. 22, in an embodiment, a video decoding apparatus is provided. The apparatus has functions of implementing the foregoing video decoding method. The functions may be implemented by using hardware, or may be implemented by hardware executing corresponding software. The apparatus may be a computer device or may be disposed in a computer device. The computer device may be a terminal or a server. The apparatus may include: an encoded data obtaining module 2202, configured to obtain encoded data corresponding to a current frame; a second determining module 2204, configured to: obtain, in a case that a target processing method corresponding to the current frame is determined as a downsampling processing method, a sampling parameter corresponding to the current frame, and determine downsampling information corresponding to the current frame according to the sampling parameter, the sampling parameter being kept consistent with a corresponding sampling parameter in an encoding process; and a decoding module 2206, configured to decode the encoded data according to the downsampling information corresponding to the video to be decoded to obtain a corresponding decoded video frame.

In an embodiment, the sampling parameter includes: the encoded data received by a decoding end and/or processed data obtained according to the encoded data received by the decoding end.

In an embodiment, the downsampling information includes a downsampling proportion; the sampling parameter includes at least one of: a frame type of the current frame and encoding information of a preceding video frame corresponding to the current frame; and the second determining module is further configured to: calculate a target sampling function value according to the sampling parameter; obtain correspondences between candidate sampling function values and candidate downsampling proportions; and determine a target downsampling proportion corresponding to the target sampling function value according to the correspondences between the candidate sampling function values and the candidate downsampling proportions.

In an embodiment, the encoding information of the preceding video frame includes resolution information of the preceding video frame; and the second determining module is further configured to: calculate the target sampling function value according to the resolution information of the preceding video frame.

In an embodiment, the encoding information of the preceding video frame further includes at least one of: a ratio of intra-coded blocks to inter-coded blocks of the preceding video frame, a frame type of the preceding video frame, and a code rate of the preceding video frame.

In an embodiment, the downsampling information includes a downsampling method; and the second determining module is further configured to: obtain a current application corresponding to the current frame; obtain correspondences between candidate applications and candidate downsampling methods; and determine a target downsampling method corresponding to the current application according to the correspondences between the candidate applications and the candidate downsampling methods.

In an embodiment, the downsampling information includes a downsampling method; and the second determining module is further configured to: obtain an application type corresponding to the current frame, and obtain hardware processing capabilities of two communication parties in a case that the application type is a real-time application type; and determine a corresponding sampling method according to the hardware processing capabilities of the two communication parties.

In an embodiment, the downsampling information includes a downsampling proportion; the decoding module is further configured to: decode the encoded data according to the downsampling proportion corresponding to the current frame to obtain a reconstructed video frame corresponding to the current frame; and upsample the reconstructed video frame according to an upsampling proportion corresponding to the downsampling proportion to obtain the decoded video frame.

In an embodiment, the decoding module is further configured to: obtain a reference frame corresponding to the current frame; determine resolution information corresponding to the current frame according to the downsampling proportion corresponding to the current frame; process the reference frame according to the resolution information to obtain a target reference frame; and decode the encoded data according to the target reference frame to obtain the reconstructed video frame corresponding to the current frame.

In an embodiment, the downsampling information further includes a downsampling method; and the decoding module is further configured to: upsample the reconstructed video frame according to the upsampling proportion corresponding to the downsampling proportion by using an upsampling method corresponding to the downsampling method to obtain the decoded video frame.

Figure 23:
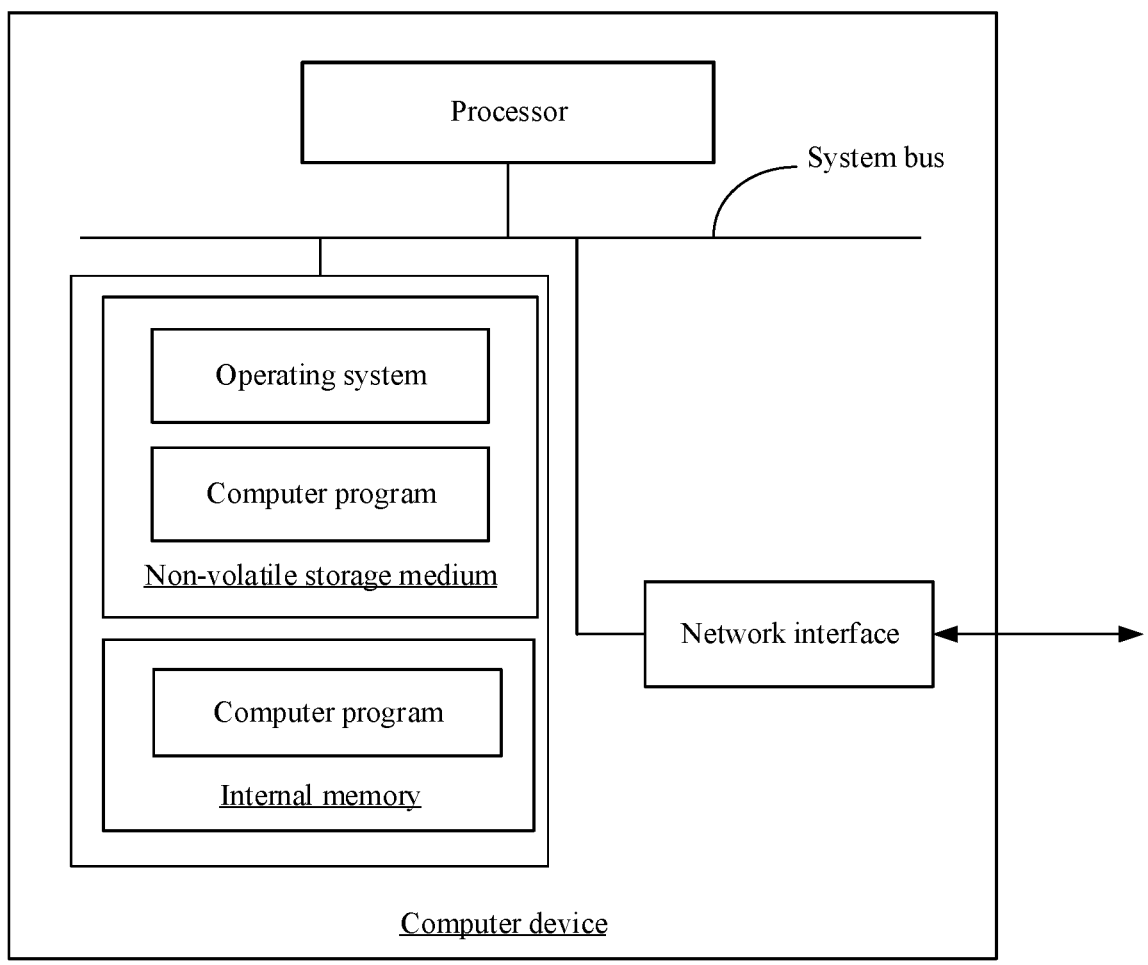
FIG. 23 is a diagram of an internal structure of a computer device in an embodiment of this application.

FIG. 23 is a diagram of the internal structure of a computer device in an embodiment. The computer device may be specifically a terminal or a server. As shown in FIG. 23, the computer device includes a processor, a memory, and a network interface connected through a system bus. The memory includes a non-volatile storage medium and an internal memory. The non-volatile storage medium of the computer device stores an operating system and may further store a computer program, the computer program, when executed by the processor, causing the processor to implement at least one of a video encoding method and a video decoding method. The internal memory may alternatively store a computer program. When executed by the processor, the computer program may cause the processor to perform at least one of a video encoding method and a video decoding method. A person skilled in the art may understand that, the structure shown in FIG. 23 is only a block diagram of a partial structure related to the solution in this application, and does not limit the computer device to which the solution of this application is applied. Specifically, the specific computer device may include more components or fewer components than those shown in the figure, or some components may be combined, or a different component deployment may be used.

In an embodiment, the video decoding apparatus provided in this application may be implemented in a form of a computer program. The computer program may run on the computer device shown in FIG. 23. The memory of the computer device may store various program modules that form the video decoding apparatus, for example, the video frame obtaining module 2102, the first determining module 2104, and the encoding module 2106 that are shown in FIG. 21. The computer program formed by the various program modules causes the processor to perform the steps of the video encoding method in the embodiments of this application that are described in this specification. For example, the computer device shown in FIG. 23 may obtain an input video frame through the video frame obtaining module 2102 in the video encoding apparatus shown in FIG. 21, obtain, through the first determining module 2104, a sampling parameter corresponding to the input video frame in a case that a target processing method corresponding to the input video frame is a downsampling processing method, the sampling parameter being reproduced in a decoding process, determine downsampling information corresponding to the input video frame according to the sampling parameter, and encode, through the encoding module 2106, the input video frame according to the downsampling information to obtain encoded data corresponding to the input video frame.

In an embodiment, the video decoding apparatus provided in this application may be implemented in a form of a computer program. The computer program may run on the computer device shown in FIG. 23. The memory of the computer device may store various program modules that form the video decoding apparatus, for example, the decoded data obtaining module 2202, the second determining module 2204, and the decoding module 2206 that are shown in FIG. 22. The computer program formed by the various program modules causes the processor to perform the steps of the video decoding method in the embodiments of this application that are described in this specification. For example, the computer device shown in FIG. 23 may obtain encoded data corresponding to a current frame through the encoded data obtaining module 2202 in the video decoding apparatus shown in FIG. 22, obtain, through the second determining module 2204 in a case that a target processing method corresponding to the current frame is determined as a downsampling processing method, a sampling parameter corresponding to the current frame, and determine downsampling information corresponding to the current frame according to the sampling parameter, the sampling parameter being kept consistent with a corresponding sampling parameter in an encoding process, and decode, through the decoding module 2206, the encoded data according to the downsampling information corresponding to the video to be decoded to obtain a corresponding decoded video frame.

In an embodiment, a computer device is provided, including a memory and a processor, the memory storing a computer program, when executed by the processor, the computer program implementing the video encoding method or the video decoding method provided in the foregoing embodiments.

In an embodiment, a computer-readable storage medium is provided, storing a computer program, the computer program, when executed by the processor, causing the processor to perform the video encoding method or the video decoding method provided in the foregoing embodiments.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application, and descriptions thereof are in detail, but cannot be understood as a limitation to the patent scope of this application. A person of ordinary skill in the art may further make variations and improvements without departing from the ideas of this application, and the variations and improvements shall fall within the protection scope of this application. Therefore, the protection scope of this patent application is subject to the protection scope of the appended claims.

What is claimed is:

1. A method, applied to a computer device, the method comprising:
    obtaining an input video frame;
    obtaining a sampling parameter corresponding to the input video frame, the sampling parameter including an average of resolutions of a plurality of preceding video frames;
    determining downsampling information corresponding to the input video frame according to the sampling parameter, wherein determining the downsampling information comprises:
        in response to determining the input video frame includes a B-frame, selecting a first downsampling proportion for the B-frame; and
        in response to determining the input video frame includes a P-frame, selecting a second downsampling proportion for the P-frame, the second downsampling proportion is lower than the first downsampling proportion, and the first and the second downsampling proportions are part of the downsampling information, and
    wherein determining the downsampling information further comprises:
        obtaining an application type corresponding to the input video frame, and obtaining hardware processing capabilities of two communication parties in response to determining the application type is a real-time application type, the real-time application type including a real-time video call application, and the two communication parties engage in the real-time video call to each other as two call terminals; and
        determining a downsampling method according to the hardware processing capabilities of the two communication parties; and
    encoding the input video frame according to the downsampling information to obtain encoded data corresponding to the input video frame.

2. The method according to claim 1, wherein the sampling parameter comprises at least one of: frame information of the input video frame and encoding information of a preceding video frame corresponding to the input video frame.

3. The method according to claim 2, wherein the encoding information of the preceding video frame comprises resolution information of the preceding video frame.

4. The method according to claim 1, wherein the encoding the input video frame according to the downsampling information to obtain encoded data corresponding to the input video frame comprises:
    processing the input video frame according to the first downsampling proportion or the second downsampling to obtain a current frame to be encoded; and
    encoding the current frame to obtain the encoded data corresponding to the input video frame.

5. The method according to claim 4, wherein the encoding the current frame comprises:
    obtaining a target reference frame; and
    encoding the current frame according to the target reference frame to obtain the encoded data corresponding to the input video frame.

6. The method according to claim 1, wherein the input video frame is a first input video frame corresponding to a first application program running on the computer device, the method further comprises:
    obtaining a second input video frame corresponding to a second application program running on the computer device, the second application program being different than the first application program;
    encoding the first input video frame according to a first downsampling method, and encoding the second input video frame according to a second downsampling method, the first downsampling method is different than the second downsampling method, and the first and the second downsampling methods are part of the downsampling information.

7. The method according to claim 6, wherein the first application program includes a real-time application program, and the second application program includes a non-real-time application program.

8. The method according to claim 1, wherein the two communication parties are each with both encoding and decoding functionalities via the real-time application type.

9. The method according to claim 1, further comprising:
obtaining a correspondence between candidate hardware processing capabilities and candidate downsampling methods;
storing the correspondence as a preset; and
determining the downsampling method further according to the correspondence.

10. A video decoding method, applied to a computer device, the method comprising:
receiving encoded data corresponding to a current frame to be decoded;
obtaining a sampling parameter corresponding to the current frame, the sampling parameter including an average of resolutions of a plurality of preceding video frames;
determining downsampling information corresponding to the current frame according to the sampling parameter, wherein downsampling information is determined by:
in response to determining the current frame frame includes a B-frame, selecting a first downsampling proportion for the B-frame; and
in response to determining the current frame includes a P-frame, selecting a second downsampling proportion for the P-frame, the second downsampling proportion is lower than the first downsampling proportion, and the first and the second downsampling proportions are part of the downsampling information, and
wherein the downsampling information is further determined by:
obtaining an application type corresponding to the input video frame, and obtaining hardware processing capabilities of two communication parties in response to determining the application type is a real-time application type, the real-time application type including a real-time video call application, and the two communication parties engage in the real-time video call to each other as two call terminals; and
determining a downsampling method according to the hardware processing capabilities of the two communication parties; and
decoding the encoded data according to the downsampling information corresponding to the video to be decoded to obtain a decoded video frame.

11. The method according to claim 10, wherein the sampling parameter comprises at least one of: a frame type of the current frame and encoding information of a preceding video frame corresponding to the current frame.

12. The method according to claim 11, wherein the encoding information of the preceding video frame comprises resolution information of the preceding video frame.

13. The method according to claim 10, wherein the decoding the encoded data according to the downsampling information corresponding to the video to be decoded to obtain a corresponding decoded video frame comprises:
decoding the encoded data according to the first downsampling proportion or the second downsampling proportion to obtain a reconstructed video frame; and
upsampling the reconstructed video frame to obtain the decoded video frame.

14. The method according to claim 13, wherein the decoding the encoded data comprises:
obtaining a reference frame corresponding to the current frame; and
determining resolution information corresponding to the current frame;
processing the reference frame according to the resolution information to obtain a target reference frame; and
decoding the encoded data according to the target reference frame to obtain the reconstructed video frame corresponding to the current frame.

15. The method according to claim 13, wherein upsampling the reconstructed video frame comprises:
upsampling the reconstructed video frame by using an upsampling method corresponding to the downsampling method.

16. A non-transitory computer-readable storage medium, storing a computer program, the computer program, when executed by a processor, causing the processor to perform:
obtaining an input video frame;
obtaining a sampling parameter corresponding to the input video frame, the sampling parameter including an average of resolutions of a plurality of preceding video frames;
determining downsampling information corresponding to the input video frame according to the sampling parameter, wherein determining the downsampling information comprises:
in response to determining the input video frame includes a B-frame, selecting a first downsampling proportion for the B-frame; and
in response to determining the input video frame includes a P-frame, selecting a second downsampling proportion for the P-frame, the second downsampling proportion is lower than the first downsampling proportion, and the first and the second downsampling proportions are part of the downsampling information, and
wherein determining the downsampling information further comprises:
obtaining an application type corresponding to the input video frame, and obtaining hardware processing capabilities of two communication parties in response to determining the application type is a real-time application type, the real-time application type including a real-time video call application, and the two communication parties engage in the real-time video call to each other as two call terminals; and
determining a corresponding sampling method according to the hardware processing capabilities of the two communication parties; and
encoding the input video frame according to the downsampling information to obtain encoded data corresponding to the input video frame.

17. The computer-readable storage medium of claim 16, the processor further performing:
receiving encoded data of a current frame;
obtaining a sampling parameter corresponding to the current frame, and determining downsampling information corresponding to the current frame according to the sampling parameter; and
decoding the encoded data according to the downsampling information corresponding to the current frame to obtain a decoded video frame.

* * * * *